(12) United States Patent
Chen et al.

(10) Patent No.: US 11,709,688 B2
(45) Date of Patent: Jul. 25, 2023

(54) DYNAMIC INTERFACE LAYOUT METHOD AND DEVICE

(71) Applicant: Huawei Device Co., Ltd., Guangdong (CN)

(72) Inventors: Xiaoxiao Chen, Nanjing (CN); Shoucheng Wang, Shanghai (CN); Zhang Gao, Shanghai (CN); Anqi Liu, Shenzhen (CN); Hao Wu, Shanghai (CN); Qichao Yang, Shanghai (CN)

(73) Assignee: HUAWEI DEVICE CO., LTD., Dongguan (CN)

( * ) Notice: Subject to any disclaimer, the term of this patent is extended or adjusted under 35 U.S.C. 154(b) by 0 days.

(21) Appl. No.: 17/667,778

(22) Filed: Feb. 9, 2022

(65) Prior Publication Data

US 2022/0269515 A1    Aug. 25, 2022

Related U.S. Application Data

(63) Continuation of application No. PCT/CN2020/107185, filed on Aug. 5, 2020.

(30) Foreign Application Priority Data

Aug. 9, 2019   (CN) .......................... 201910736677.4

(51) Int. Cl.
*G06F 9/451* (2018.01)
*G06F 3/04855* (2022.01)
(Continued)

(52) U.S. Cl.
CPC .......... *G06F 9/451* (2018.02); *G06F 3/04855* (2013.01); *G06F 3/14* (2013.01); *G06F 8/38* (2013.01)

(58) Field of Classification Search
None
See application file for complete search history.

(56) References Cited

U.S. PATENT DOCUMENTS 10,326,655 B1    6/2019   Sait et al.
11,435,899 B1 *  9/2022   Michaels .............. G06F 3/0485
(Continued)

FOREIGN PATENT DOCUMENTS

| CN | 101151847 A | 3/2008 |
| CN | 102611735 A | 7/2012 |

(Continued)

OTHER PUBLICATIONS

"GridlayoutManager with dynamic span count," Aug. 29, 2018, XP055939089, 5 pages.

*Primary Examiner* — Toan H Vu
(74) *Attorney, Agent, or Firm* — Conley Rose, P.C.

(57) ABSTRACT

A dynamic interface layout method includes that a width of a screen of an electronic device is divided into a plurality of columns. The electronic device displays a first interface on the screen. After detecting an interface refresh signal, the electronic device obtains a first column quantity corresponding to a width of a second interface to be displayed after refreshing. The first column quantity is a quantity of columns included in the width of the second interface. The electronic device determines a second column quantity according to a layout rule corresponding to a first element on the second interface. The second column quantity is a quantity of columns included in a width of the first element. The electronic device displays the second interface on the screen.

20 Claims, 28 Drawing Sheets

(51) Int. Cl.
*G06F 3/14* (2006.01)
*G06F 8/38* (2018.01)

(56) References Cited

U.S. PATENT DOCUMENTS

| | | | | |
|---|---|---|---|---|
| 2003/0182628 A1* | 9/2003 | Lira | G06F 3/0488 | 715/252 |
| 2006/0215577 A1 | 9/2006 | Guichard et al. | | |
| 2009/0187815 A1* | 7/2009 | Becerra, Sr | G06F 16/283 | 715/212 |
| 2013/0239063 A1* | 9/2013 | Ubillos | G06F 3/04845 | 715/838 |
| 2014/0181646 A1* | 6/2014 | Rangwala | G06F 16/345 | 715/252 |
| 2016/0092084 A1* | 3/2016 | Dyar | G06F 3/0484 | 715/765 |
| 2016/0266749 A1* | 9/2016 | Kennedy, Jr. | G06F 40/106 | |
| 2016/0292133 A1* | 10/2016 | Elings | G06F 40/131 | |
| 2016/0292134 A1 | 10/2016 | Elings et al. | | |
| 2017/0060819 A1 | 3/2017 | Rucine et al. | | |
| 2017/0154022 A1* | 6/2017 | Wang | G06F 3/0482 | |
| 2017/0338976 A1 | 11/2017 | Wang et al. | | |
| 2018/0091420 A1 | 3/2018 | Drake et al. | | |
| 2018/0211635 A1* | 7/2018 | Ishibashi | G02B 27/0101 | |
| 2018/0270720 A1 | 9/2018 | Shi et al. | | |
| 2019/0355177 A1* | 11/2019 | Manickam | G06F 30/13 | |
| 2022/0277684 A1* | 9/2022 | Karafin | G09G 3/2092 | |

FOREIGN PATENT DOCUMENTS

| | | |
|---|---|---|
| CN | 105991435 A | 10/2016 |
| CN | 106101262 A | 11/2016 |
| CN | 107592274 A | 1/2018 |
| CN | 107612832 A | 1/2018 |
| CN | 107872392 A | 4/2018 |
| CN | 108028783 A | 5/2018 |
| CN | 108737271 A | 11/2018 |
| CN | 208849791 U | 5/2019 |
| JP | 2012083160 A | 4/2012 |
| KR | 100772924 B1 | 11/2007 |

* cited by examiner

DYNAMIC INTERFACE LAYOUT METHOD AND DEVICE

CROSS-REFERENCE TO RELATED APPLICATIONS

This is a continuation of International Patent Application No. PCT/CN2020/107185 filed on Aug. 5, 2020, which claims priority to Chinese Patent Application No. 201910736677.4 filed on Aug. 9, 2019. The disclosures of the aforementioned applications are hereby incorporated by reference in their entireties.

TECHNICAL FIELD

Embodiments of this application relate to the field of electronic technologies, and in particular, to a dynamic interface layout method and a device.

BACKGROUND

With the development of electronic technologies, display forms of electronic devices are increasingly diversified. The display form of the electronic device relates to factors such as a size, a proportion, or a resolution of a display screen. For example, different electronic devices such as a mobile phone, a tablet computer, a television, and a watch have different screen sizes and different display forms. For another example, the mobile phone may have a plurality of aspect ratios such as 16:9, 17:9, 18:9, 19:9, and 25:9, and therefore may have a plurality of display forms. A foldable screen may also enable a same electronic device to have a plurality of different display forms.

Interface development and design of an application are complex for a plurality of display forms corresponding to different electronic devices or a same electronic device. To adapt to different display forms, an application developer needs to develop a set of interface layout for each display form. Consequently, application development costs are relatively high, and an application packaging file is also relatively large.

SUMMARY

Embodiments of this application provide a dynamic interface layout method and a device, so that an electronic device can automatically perform dynamic layout of an element on an application interface according to a preset layout rule and based on a current display form, and an application with a set of interface layout can perform dynamic layout of the element and the interface by adapting to different display forms.

To achieve the foregoing objectives, the following technical solutions are used in the embodiments of this application.

According to one aspect, a technical solution of this application provides a dynamic interface layout method, applied to an electronic device, where the electronic device includes a screen, the screen is used for interface display, a width of the screen is divided into a plurality of columns, and the method includes the following. The electronic device displays a first interface. After detecting an interface refresh signal, the electronic device obtains a first column quantity corresponding to a width of a second interface to be displayed after refreshing. The first column quantity is a quantity of columns included in the width of the second interface. The electronic device determines a second column quantity according to a layout rule corresponding to a first element on the second interface. The second column quantity is a quantity of columns included in a width of the first element, and the layout rule includes a correspondence between the second column quantity and the first column quantity. The electronic device displays the second interface.

In this way, the electronic device may determine a width of an element on the second interface based on the width of the to-be-displayed second interface of the application in different display forms, so as to perform dynamic layout of the element on the second interface, that is, perform dynamic layout of the second interface. Therefore, for an application with a set of interface layout, dynamic interface layout may be performed by adapting to different display forms of different electronic devices or a same electronic device, and user experience is relatively high.

In a possible design, the width of the screen further includes at least one gutter and two margins, the gutter is a distance between two adjacent columns, and the margin is a distance between a boundary on a left/right side of the screen and a nearest column.

In other words, a column system obtained through division in this embodiment of this application may include a column, a gutter between columns, and margins on two sides of the column.

In another possible design, the layout rule further includes a size of the gutter and a size of the margin, and that the electronic device displays the second interface includes the following. The electronic device determines a width of the column based on the width of the second interface, the size of the gutter, the size of the margin, and the first column quantity. The electronic device determines the width of the first element based on the second column quantity, the width of the column, and the size of the gutter. The electronic device displays the second interface.

In other words, the electronic device may calculate a width size of the first element such as a device-independent pixels (dp) value or a quantity of pixels corresponding to the width of the first element based on the second column quantity, so as to perform display on the screen.

In another possible design, that the electronic device detects an interface refresh signal includes the following. The electronic device detects an operation of opening an application. Alternatively, the electronic device detects that a width of an interface changes.

It may be understood that after a user opens a new application or switches a program from the background to the foreground, the electronic device needs to refresh the interface. Alternatively, when the electronic device detects that a width of a to-be-displayed interface changes, the electronic device needs to refresh the interface.

In another possible design, that the electronic device detects that a width of an interface changes includes the following. The electronic device detects that a display status is switched. The display status includes a landscape display state or a portrait display state. Alternatively, if the screen is a foldable screen, the electronic device detects that a folding state of the foldable screen changes. Alternatively, the electronic device detects that a display mode is switched. The display mode includes a full-screen display mode, a split-screen display mode, a picture-in-picture display mode, or a floating window display mode.

It may be understood that when the landscape/portrait screen is switched, the display mode is switched, or the folding state of the foldable screen changes, a display width of the interface also changes accordingly, and the electronic device needs to refresh the interface.

In another possible design, a first parameter is used to represent the width of the second interface, and different intervals in which the first parameter is located correspond to different first column quantities.

For example, the first parameter may be a dp value, and the electronic device determines a column quantity based on the dp value, so that in different display forms, display effects of the element and the interface on which dynamic layout is performed based on the column quantity are more consistent.

In another possible design, the width of the second interface varies with a size, a proportion, a display status, or a display mode of the screen.

It may be understood that there may be a plurality of factors that affect the width of the second interface, for example, the size, the proportion, the display status, or the display mode of the screen.

In another possible design, that the electronic device determines a second column quantity according to a layout rule corresponding to a first element on the second interface includes the following. The application controls the first element to invoke an application programming interface (API), and determines the second column quantity according to the layout rule corresponding to the first element. Alternatively, the application invokes the API, and determines the second column quantity according to the layout rule corresponding to the first element.

That is, the application may control the first element to determine a quantity of columns occupied by the width of the first element, or the application may directly determine the quantity of columns occupied by the width of the first element.

In another possible design, the first element is a column bubble, and the layout rule corresponding to the column bubble includes: size of the margin=first preset value, size of the gutter=second preset value, and if the first column quantity is a third preset value, the second column quantity is a fourth preset value, or if the first column quantity is a fifth preset value, the second column quantity is a sixth preset value, where the fifth preset value is greater than the third preset value, and the sixth preset value is greater than the fourth preset value.

In this way, the layout rule includes the correspondence between the second column quantity and the first column quantity, and the electronic device may determine the second column quantity according to the layout rule, and obtain the size of the gutter and the size of the margin.

In another possible design, that if the first column quantity is a third preset value, the second column quantity is a fourth preset value includes the following. If the first column quantity is the third preset value, and a ratio of the width to a height of the second interface is greater than a first preset ratio, the second column quantity is the fourth preset value. If the first column quantity is the fifth preset value, and the ratio of the width to the height of the second interface is less than or equal to the first preset ratio, the second column quantity is the sixth preset value. The sixth preset value is greater than the fourth preset value.

In this solution, the layout rule includes a correspondence between the second column quantity, the first column quantity, and the ratio of the width to the height of the second interface.

In another possible design, the first element is a composite control, and the composite control includes a first sub-element and a second sub-element, and a layout rule corresponding to the composite control further includes a correspondence between relative positions of the first sub-element and the second sub-element and the width of the second interface.

In this way, the electronic device may further determine the relative positions of the first sub-element and the second sub-element according to the layout rule of the composite control, so as to perform dynamic layout of the first sub-element and the second sub-element.

In another possible design, the layout rule further includes a correspondence between the relative positions of the first sub-element and the second sub-element, a height and a width of the first sub-element and the second sub-element, and the width and the height of the second interface.

In this solution, the layout rule specifies the relative positions of the first sub-element and the second sub-element, which is further associated with the width and the height of the second interface.

In another possible design, the composite control includes a sub-element A and a sub-element B, and the layout rule includes the following. When the sub-element A and the sub-element B are arranged in a first direction, if W≥Width(A)+Width(B)+Margin, the sub-element A and the sub-element B switch to be arranged in a second direction, where W represents the width of the second interface, Width(A) represents a width of the sub-element A, and Width(B) represents a width of the sub-element B. When the sub-element A and the sub-element B are arranged in the second direction, if W<Width(A)+Width(B)+Margin, the sub-element A and the sub-element B switch to be arranged in the first direction. In addition, when the sub-element A and the sub-element B are arranged in the first direction, if H<Height(A)+Height(B)+vertialMargin, a scrollbar is embedded in the composite control, and the scrollbar is configured to display the sub-element A and the sub-element B in scrolling mode, where H represents the height of the second interface, Height(A) represents a height of the sub-element A, Height(B) represents a height of the sub-element B, and vertialMargin represents a size of a margin of the screen in the first direction.

The layout rule provides a specific dynamic layout mode for the composite control. The electronic device may adjust an arrangement mode and the relative positions of the first sub-element and the second sub-element according to the layout rule.

In another possible design, the layout rule is written in a description file, or the layout rule is encapsulated in a function.

In this way, the electronic device may use the layout rule by running the description file or invoking the function.

In another possible design, the layout rule is preset at an application framework layer of the electronic device.

In this way, each application may perform adaptive dynamic layout by using the layout rule configured at the application framework layer.

In another possible design, the layout rule is integrated into the application.

In this way, the application in any electronic device or any display form may perform adaptive dynamic layout according to the integrated layout rule.

According to another aspect, an embodiment of this application provides a response apparatus. The apparatus is included in a first electronic device, a second electronic device, or a third electronic device. The apparatus has a function of implementing behavior of the first electronic device, the second electronic device, or the third electronic device in any method according to the foregoing aspects and the possible designs. The function may be implemented by hardware, or may be implemented by hardware executing corresponding software. The hardware or the software includes at least one module or unit corresponding to the functions. For example, an application module or unit, a control module or unit, a column management interface module or unit, a column resource calculation module or unit, and a column system configuration module or unit.

According to another aspect, an embodiment of this application provides an electronic device, including a screen, where a width of the screen is divided into a plurality of columns, one or more processors, and a memory, where the memory stores code. When the code is executed by the one or more processors, the electronic device is enabled to perform the dynamic interface layout method in any possible design of the foregoing aspects.

According to another aspect, an embodiment of this application provides a computer storage medium, including computer instructions. When the computer instructions are run on a mobile device, the mobile device is enabled to perform the dynamic interface layout method in any possible design of the foregoing aspects.

According to still another aspect, an embodiment of this application provides a computer program product. When the computer program product runs on a computer, the computer is enabled to perform the dynamic interface layout method in any possible design of the foregoing aspects.

DESCRIPTION OF EMBODIMENTS

The following describes the technical solutions in the embodiments of this application with reference to the accompanying drawings in the embodiments of this application. In descriptions of the embodiments of this application, "I" means "or" unless otherwise specified. For example, AB may represent A or B. In this specification, "and/or" describes only an association relationship for describing associated objects and represents that three relationships may exist. For example, A and/or B may represent the following three cases: only A exists, both A and B exist, and only B exists. In addition, in the descriptions in the embodiments of this application, "a plurality of" means two or more than two.

In the conventional technology, because of a complex case in which an electronic device has a plurality of display forms, a set of interface layout for each display form usually needs to be developed in an application. An ANDROID system is used as an example. The ANDROID system may use an Extensible Markup Language (XML) file to represent a user interface (UI) composition of an application. An XML file of a same application may include an XML file corresponding to a mobile phone, an XML file corresponding to a tablet computer, an XML file corresponding to a watch, an XML file corresponding to a television, and the like, to separately implement different interface layout effects on the mobile phone, the tablet computer, the watch, and the television. Consequently, application development costs are relatively high, and an application packaging file is also relatively large.

In an embodiment of this application, a dynamic interface layout method is provided, and can be applied to an electronic device. When the electronic device needs to refresh an interface, the electronic device may automatically perform dynamic layout of an element on an application interface according to a preset layout rule and based on a current display form. Because the interface includes the element, performing dynamic layout of the element on the interface can implement dynamic layout of the interface. Therefore, according to the method provided in this embodiment of this application, for different display forms, an application with a set of interface layout can implement a dynamic display effect of a plurality of interface layouts. Because the application is configured with only one set of interface layout, application development costs and packaging files are relatively small.

For example, the electronic device may be a device having a display function, such as a mobile phone, a tablet computer, a television, a desktop computer, a wearable device (such as a watch), a vehicle-mounted device, an augmented reality (AR)/virtual reality (VR) device, a laptop, an ultra-mobile personal computer (UMPC), a netbook, or a personal digital assistant (PDA). A specific type of the electronic device is not limited in this embodiment of this application.

Figure 1:
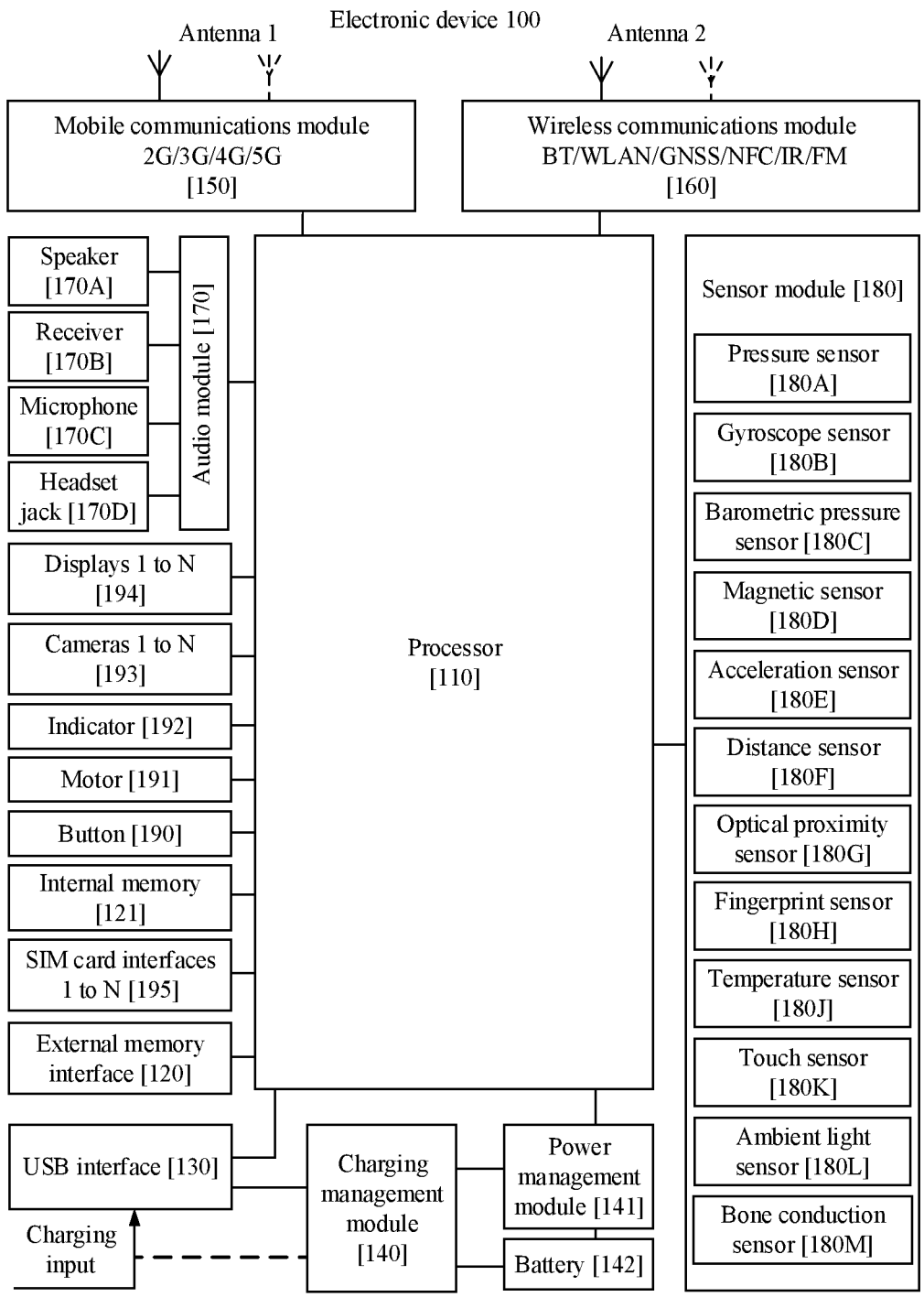
FIG. 1 is a schematic diagram of a hardware structure of an electronic device according to an embodiment of this application.

For example, FIG. 1 is a schematic diagram of a structure of an electronic device 100. The electronic device 100 may include a processor 110, an external memory interface 120, an internal memory 121, a Universal Serial Bus (USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, a neural-network processing unit (NPU), and/or the like. Different processing units may be independent devices, or may be integrated into one or more processors.

The controller may be a nerve center and a command center of the electronic device 100. The controller may generate an operation control signal based on an instruction operation code and a time sequence signal, to complete control of instruction fetching and instruction execution.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor may directly invoke the instructions or the data from the memory. This avoids repeated access and reduces waiting time of the processor 110, so that system efficiency is improved.

In some embodiments, the processor 110 may include one or more interfaces. The interface may include an Inter-Integrated Circuit (I2C) interface, an I2C Sound (I2S) interface, a pulse-code modulation (PCM) interface, a universal asynchronous receiver/transmitter (UART) interface, a Mobile Industry Processor Interface (MIPI), a general-purpose input/output (GPIO) interface, a SIM interface, a USB interface, and/or the like.

The I2C interface is a two-way synchronization serial bus, and includes a serial data line (SDA) and a serial (derail) clock line (SCL). In some embodiments, the processor 110 may include a plurality of groups of I2S buses. The processor 110 may be separately coupled to the touch sensor 180K, a charger, a flashlight, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communications module 160 through the I2S interface, to implement a function of answering a call by using a Bluetooth headset.

The PCM interface may also be configured to perform audio communication, and sample, quantize, and code an analog signal. In some embodiments, the audio module 170 may be coupled to the wireless communications module 160 through a PCM bus interface. In some embodiments, the audio module 170 may alternatively transmit an audio signal to the wireless communications module 160 through the PCM interface, to implement a function of answering a call by using a Bluetooth headset. Both the I2S interface and the PCM interface may be configured to perform audio communication.

The UART interface is a universal serial data bus, and is configured to perform asynchronous communication. The bus may be a two-way communications bus. The bus converts to-be-transmitted data between serial communication and parallel communication. In some embodiments, the UART interface is usually configured to connect the processor 110 to the wireless communications module 160. For example, the processor 110 communicates with a Bluetooth module in the wireless communications module 160 through the UART interface, to implement a Bluetooth function. In some embodiments, the audio module 170 may transmit an audio signal to the wireless communications module 160 through the UART interface, to implement a function of playing music by using a Bluetooth headset.

The MIPI interface may be configured to connect the processor 110 to a peripheral component such as the display 194 or the camera 193. The MIPI interface includes a camera serial interface (CSI), a display serial interface (DSI), and the like. In some embodiments, the processor 110 communicates with the camera 193 through the CSI interface, to implement a photographing function of the electronic device 100. The processor 110 communicates with the display 194 through the DSI interface, to implement a display function of the electronic device 100.

The GPIO interface may be configured by using software. The GPIO interface may be configured as a control signal or a data signal. In some embodiments, the GPIO interface may be configured to connect the processor 110 to the camera 193, the display 194, the wireless communications module 160, the audio module 170, the sensor module 180, or the like. The GPIO interface may alternatively be configured as an I2C interface, an I2S interface, a UART interface, an MIPI interface, or the like.

The USB interface 130 is an interface that conforms to a USB standard specification, and may be further a mini USB interface, a micro USB interface, a USB Type-C interface, or the like. The USB interface 130 may be configured to connect to a charger for charging the electronic device 100, may be configured to transmit data between the electronic device 100 and a peripheral device, or may be configured to connect to a headset for playing audio through the headset. Alternatively, the interface may be configured to connect to another electronic device, for example, an AR device.

It can be understood that an interface connection relationship between the modules in this embodiment of this application is merely an example for description, and does not constitute a limitation on the structure of the electronic device 100. In some other embodiments of this application, the electronic device 100 may alternatively use an interface connection manner different from an interface connection manner in this embodiment, or a combination of a plurality of interface connection manners.

The charging management module 140 is configured to receive a charging input from the charger. The charger may be a wireless charger or a wired charger. In some embodiments in which wired charging is used, the charging management module 140 may receive a charging input from the wired charger through the USB interface 130. In some embodiments in which wireless charging is used, the charging management module 140 may receive a wireless charging input through a wireless charging coil of the electronic device 100. The charging management module 140 may further supply power to the electronic device by using the power management module 141 when the battery 142 is charged.

The power management module 141 is configured to connect the battery 142 and the charging management module 140 to the processor 110. The power management module 141 receives an input of the battery 142 and/or the charging management module 140, and supplies power to the processor 110, the internal memory 121, an external memory, the display 194, the camera 193, the wireless communications module 160, and the like. The power management unit 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented through the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the electronic device 100 may be configured to cover one or more communication frequency bands. Different antennas may be further multiplexed, to improve antenna utilization. For example, the antenna 1 may be multiplexed as a diversity antenna in a wireless local area network. In some other embodiments, the antenna may be used in combination with a tuning switch.

The mobile communications module 150 may provide a wireless communication solution that includes second generation (2G)/third generation (3G)/fourth generation (4G)/fifth generation (5G) or the like and that is applied to the electronic device 100. The mobile communications module 150 may include at least one filter, a switch, a power amplifier, a low noise amplifier (LNA), and the like. The mobile communications module 150 may receive an electromagnetic wave through the antenna 1, perform processing such as filtering or amplification on the received electromagnetic wave, and transmit a processed electromagnetic wave to the modem processor for demodulation. The mobile communications module 150 may further amplify a signal modulated by the modem processor, and convert the signal into an electromagnetic wave through the antenna 1 for radiation. In some embodiments, at least some function modules in the mobile communications module 150 may be disposed in the processor 110. In some embodiments, at least some function modules in the mobile communications module 150 may be disposed in a same device as at least some modules in the processor 110.

The modem processor may include a modulator and a demodulator. The modulator is configured to modulate a to-be-sent low-frequency baseband signal into a medium-frequency or high-frequency signal. The demodulator is configured to demodulate a received electromagnetic wave signal into a low-frequency baseband signal. Then, the demodulator transfers the low-frequency baseband signal obtained through demodulation to the baseband processor for processing. The baseband processor processes the low-frequency baseband signal, and then transfers a processed signal to the application processor. The application processor outputs a sound signal by using an audio device (which is not limited to the speaker 170A, the receiver 170B, or the like), or displays an image or a video through the display 194. In some embodiments, the modem processor may be an independent device. In some other embodiments, the modem processor may be independent of the processor 110, and is disposed in a same device as the mobile communications module 150 or another function module.

The wireless communications module 160 may provide a wireless communication solution that includes a wireless local area network (WLAN) (for example, a WI-FI network), BLUETOOTH (BT), a global navigation satellite system (GNSS), frequency modulation (FM), near-field communication (NFC), an infrared (IR) technology, or the like and that is applied to the electronic device 100. The wireless communications module 160 may be one or more devices that integrate at least one communications processor module. The wireless communications module 160 receives an electromagnetic wave through the antenna 2, performs frequency modulation and filtering processing on the electromagnetic wave signal, and sends a processed signal to the processor 110. The wireless communications module 160 may further receive a to-be-sent signal from the processor 110, perform frequency modulation and amplification on the signal, and convert a processed signal into an electromagnetic wave through the antenna 2 for radiation.

In some embodiments, the antenna 1 and the mobile communications module 150 in the electronic device 100 are coupled, and the antenna 2 and the wireless communications module 160 in the electronic device 100 are coupled, so that the electronic device 100 can communicate with a network and another device by using a wireless communications technology. The wireless communications technology may include a Global System for Mobile Communications (GSM), a General Packet Radio Service (GPRS), code-division multiple access (CDMA), wideband CDMA (WCDMA), time-division synchronous CDMA (TD-SCDMA), Long-Term Evolution (LTE), BT, a GNSS, a WLAN, NFC, FM, an IR technology, and/or the like. The GNSS may include a Global Positioning System (GPS), a global navigation satellite system (GLONASS), a BEIDOU navigation satellite system (BDS), a quasi-zenith satellite system (QZSS), and/or a satellite based augmentation system (SBAS).

The electronic device 100 implements a display function by using the GPU, the display 194, the application processor, and the like. The GPU is a microprocessor for image processing, and connects the display 194 to the application processor. The GPU is configured to perform mathematical and geometric calculation, and render an image. The processor 110 may include one or more GPUs that execute program instructions to generate or change display information.

The display 194 is configured to display an image, a video, and the like. The display 194 includes a display panel. The display panel may be a liquid-crystal display (LCD), an organic light-emitting diode (LED) (OLED), an active-matrix OLED (AMOLED), a flexible LED (FLED), a mini-LED, a micro-LED, a micro-OLED, a quantum dot LED (QLED), or the like. In some embodiments, the electronic device 100 may include one or N displays 194, where N is a positive integer greater than 1.

In this embodiment of this application, the display 194 may be configured to display, based on a display form of the electronic device 100, an element and an interface of an application after dynamic layout.

The display form of the electronic device 100 refers to a state in which the electronic device 100 displays a UI. The display form of the electronic device 100 varies with different factors such as a size of the display 194, a proportion of the display 194, a resolution of the display 194, a display status, or a display mode. The display form of the electronic device 100 varies with a size of the display 194, a proportion of the display 194, a resolution of the display 194, a display status, or a display mode. Generally, a width of the display 194 and a width of an interface on the display 194 vary with a display form.

The display mode may include a full-screen display mode, a split-screen display mode, a picture-in-picture display mode, or a floating window display mode. The display status may include a landscape display state or a portrait display state. For example, in the landscape display state, the electronic device 100 may correspond to any display form. In the portrait display state, the electronic device 100 may correspond to another display form.

The element refers to a series of controls on the interface that meet user browsing or interaction requirements. For example, the element may include controls such as a bubble, a pop-up window, a button, a card, a tab, a bottom navigation bar (or a bottom tab), or a combination of controls.

The width of the display 194 may be divided into a plurality of columns. A distance between columns may be referred to as a gutter. A distance between a left/right boundary of the display 194 and a nearest column may be referred to as a margin. Division of the column, the gutter, and the margin forms a column system. A size of each column is the same, a size of each gutter is the same, and a size of each margin is also the same. For example, refer to FIG. 2A. The width of the display 194 of the electronic device 100 may be divided into two margins, several columns, and several gutters.

A quantity of columns divided by the width of the display 194 may be determined based on the width of the display 194. The quantity of divided columns may vary with the width of the display 194. For example, in different landscape/portrait display states, widths of the display 194 are different, and therefore, the quantity of columns divided by the width of the display 194 is also different.

The quantity of columns included in the width of the display 194 may be further determined in a plurality of manners. In some embodiments, the width of the display 194 is represented by a physical size or a quantity of pixels. The quantity of columns included in the width of the display 194 may be determined based on the physical size or the quantity of pixels of the width of the display 194. A larger physical size or quantity of pixels of the width of the display 194 indicates a larger quantity of columns included in the width of the display 194. A smaller physical size or quantity of pixels of the width of the display 194 indicates a smaller quantity of columns included in the width of the display 194.

Figure 2A:
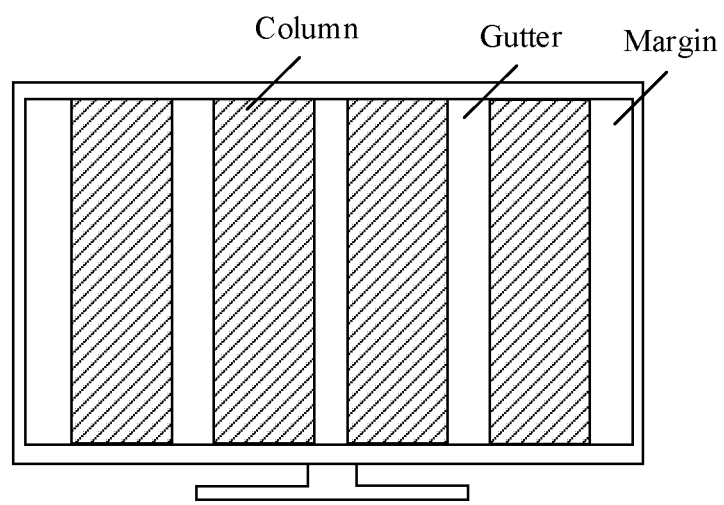
FIG. 2A is a schematic diagram of division of a column system according to an embodiment of this application.

It should be noted that, in the following embodiments of this application, an electronic device in a posture shown in FIG. 2A is used as an example for description. In this way, the width of the display 194 is a length of the display 194 in a horizontal direction, and a height of the display 194 is a length of the display 194 in a vertical direction.

In some other embodiments, the width of the display 194 is represented by a dp value. dp value=quantity of pixels corresponding to the width of the display 194/pixels per inch (PPI). A column quantity is determined based on the dp value of the width of the display 194. For example, if the resolution of the display 194 of the electronic device 100 is 1280P*720P, and in the portrait display state, the quantity of pixels corresponding to the width of the display 194 is 720, and the PPI is 2, the dp value=720/2=360 dp.

A higher PPI indicates richer picture details. However, PPIs of different displays 194 are usually different. Therefore, display effects of the displays 194 are different even if physical sizes or quantities of pixels of the displays 194 are the same. However, if dp values of widths of different displays 194 are the same, it may indicate that display effects of different displays 194 in a width direction are the same. Therefore, the column quantity is determined based on the dp value of the width of the display 194, so that in different display forms, display effects of the element and the interface on which dynamic layout is performed based on the column quantity are more consistent.

It may be understood that factors such as physical sizes, quantities of pixels, resolutions, landscape/portrait display states, and display modes that are of the widths of the displays 194 corresponding to a same display form are the same. Therefore, dp values of the widths of the displays 194 corresponding to a same display form are the same, and quantities of columns included in widths of to-be-displayed interfaces corresponding to a same display form are also the same. Different display forms may correspond to different column quantities.

It should be noted that the quantity of columns on the electronic device 100 may be preset on the electronic device 100 before delivery, or may be obtained through calculation based on the resolution and PPI of the display 194 after the electronic device 100 is started.

The following embodiments of this application are mainly described by using an example in which the column quantity is determined based on the dp value of the width of the display 194.

For example, different intervals of the dp value may correspond to different column quantities. Refer to Table 1. When a size of the width of the display 194 falls within a range of (0, 320 dp), the column quantity of the display 194 is 2. When the size of the width of the display 194 falls within a range of [320 dp, 600 dp), the column quantity of the display 194 is 4. When the size of the width of the display 194 falls within a range of [600 dp, 840 dp), the quantity of columns included in the width of the to-be-displayed interface is 8. When the size of the width of the display 194 is greater than or equal to 840 dp, the column quantity of the display 194 is 12.

TABLE 1

| | Size of a width of a display | | | |
|---|---|---|---|---|
| | (0, 320 dp) | [320 dp, 600 dp) | [600 dp, 840 dp) | [840 dp, +∞) |
| Column quantity | 2 | 4 | 6 | 8 |

Figure 2B:
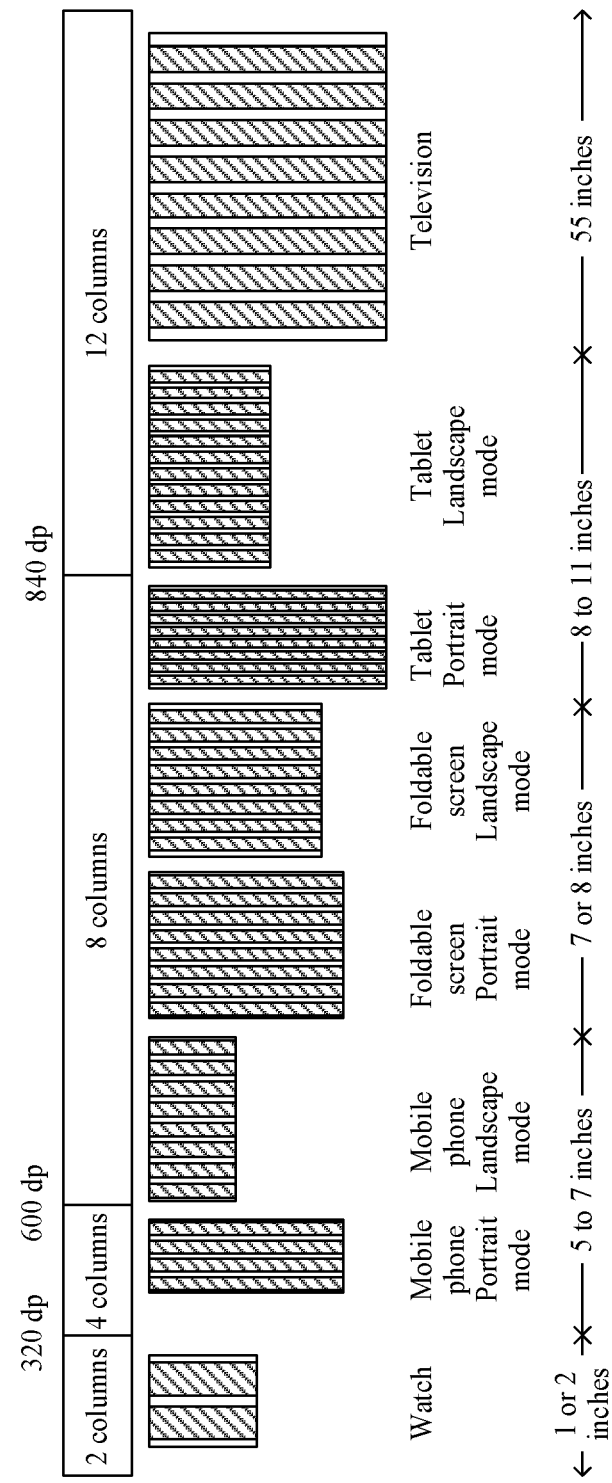
FIG. 2B is a schematic diagram of a correspondence between a column quantity and a screen size according to an embodiment of this application.

For example, refer to FIG. 2B. A physical size of a width of a display 194 of a watch may be 1 or 2 inches, which falls within a range of (0, 320 dp), and includes 2 columns. A physical size of a width of a display 194 of a mobile phone may be 5 to 7 inches. In a portrait display state, the size of the width of the display 194 falls within a range of [320 dp, 600 dp), and includes 4 columns. In a landscape display state, the size of the width of the display 194 falls within a range of [600 dp, 840 dp), and includes 8 columns. A physical size of a width of a display 194 of a foldable screen device may be 7 or 8 inches. When a foldable screen is unfolded, the size of the width of the foldable screen falls within a range of [600 dp, 840 dp), and includes 8 columns. A physical size of a width of a display 194 of a tablet computer may be 8 to 11 inches. In a portrait display state, the size of the width of the display 194 falls within a range of [600 dp, 840 dp), and includes 8 columns. In a landscape display state, the size of the width of the display 194 falls within a range of [840 dp, +∞), and includes 12 columns. A physical size of a width of a display 194 of a television may be 55 inches, which falls within a range of [840 dp, +∞), and includes 12 columns.

The column system of the electronic device 100 may include a plurality of types, for example, a basic column system, a grid column system, a pop-up column system, or a card column system. The grid column system may be used to assist in dynamic layout of a grid layout. For example, the grid layout may be a desktop icon layout, a picture thumbnail layout, or the like. A horizontal spacing between elements in the grid layout may be equal to the gutter. The pop-up column system may be used to assist in dynamic layout of a pop-up window. The card column system may be used to assist in dynamic layout of a card. The basic column system may be used as a general column system to assist in dynamic layout of various elements on the interface.

Different types of column systems correspond to different gutter sizes or margin sizes. For example, for sizes of gutters or margins corresponding to different types of column systems, refer to Table 2.

TABLE 2

| Column system type | Margin | Gutter |
| --- | --- | --- |
| Basic column system | 24 dp | 24 dp |
| Grid column system | 24 dp | 12 dp |
| Pop-up column system | 16 dp | 16 dp |
| Card column system | 8 dp | 8 dp |
| ... | | |

It should be noted that the sizes of the gutter and the margin provided in this embodiment of this application are merely examples for description, and may also be other values. This is not limited in this embodiment of this application. In addition, even for column systems of a same type, sizes of gutters and margins corresponding to different display forms or different electronic devices 100 may be different.

The electronic device 100 may calculate a width of a column based on the column quantity, and the sizes of the gutter and the margin (or based on the column system type). Therefore, the electronic device 100 may perform column division on the display 194 of the electronic device 100 based on the column quantity, the width of the column, the size of the gutter, and the size of the margin.

The electronic device 100 may implement a photographing function through the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. The photosensitive element of the camera converts an optical signal into an electrical signal, and transmits the electrical signal to the ISP for processing. The ISP converts the electrical signal into a visible image. The ISP may further perform algorithm optimization on noise, brightness, and complexion of the image. The ISP may further optimize parameters such as exposure and color temperature of a photographing scenario. In some embodiments, the ISP may be disposed in the camera 193.

The camera 193 is configured to capture a static image or a video. An optical image of an object is generated by using the lens, and is projected onto the photosensitive element. The photosensitive element may be a charge coupled device (CCD) or a complementary metal-oxide-semiconductor (CMOS) photoelectric transistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format such as red, green, and blue (RGB) or luma, blue projection, and red projection (YUV). In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transform on frequency energy and the like.

The video codec is configured to compress or decompress a digital video. The electronic device 100 may support one or more video codecs. Therefore, the electronic device 100 may play or record videos in a plurality of coding formats, for example, Moving Picture Experts Group (MPEG)-1, MPEG-2, MPEG-3, and MPEG-4.

The NPU is a neural-network (NN) computing processor, quickly processes input information by referring to a structure of a biological neural network, for example, by referring to a mode of transmission between human brain neurons, and may further continuously perform self-learning. The NPU can implement applications such as intelligent cognition of the electronic device 100, such as image recognition, facial recognition, speech recognition, and text understanding.

The external memory interface 120 may be configured to connect to an external storage card, for example, a micro SD card, to extend a storage capability of the electronic device 100. The external storage card communicates with the processor 110 through the external memory interface 120, to implement a data storage function. For example, files such as music and a video are stored in the external memory card.

The internal memory 121 may be configured to store computer-executable program code. The executable program code includes instructions. The processor 110 runs the instructions stored in the internal memory 121, to perform various function applications of the electronic device 100 and data processing. The internal memory 121 may include a program storage area and a data storage area. The program storage area may store an operating system, an application required by at least one function (for example, a voice playing function or an image playing function), and the like.

The data storage area may store data (for example, audio data and an address book) created in a process of using the electronic device 100, and the like. In addition, the internal memory 121 may include a high-speed random-access memory (RAM), or may include a nonvolatile memory, for example, at least one magnetic disk storage device, a flash memory, or a Universal Flash Storage (UFS).

In this embodiment of this application, the internal memory 121 may store a layout rule. The layout rule may be preset in an operating system of the electronic device 100, or may be integrated into a stored application. When the application refreshes the interface, the processor 110 may perform dynamic layout of elements on the interface of the application according to the preset layout rule and based on a current display form of the display 194, so as to implement dynamic layout of the interface by adapting to different display forms.

The layout rule may be used to describe a correspondence between width information of the element on the interface and width information of the to-be-displayed interface. Because column division is performed on the width of the display 194, the width of the interface displayed on the display 194 or the width of the to-be-displayed interface may also be represented by a quantity of occupied columns. For example, the layout rule is used to describe a correspondence between the width information of the element on the interface and a quantity of columns included in the width of the to-be-displayed interface. When the application refreshes the interface, the processor 110 may determine width information of an element on the to-be-displayed interface based on the quantity of columns included in the width of the to-be-displayed interface in the current display form and the correspondence, so as to perform dynamic layout of the element, and implement dynamic layout of the interface by adapting to different display forms.

For example, the width information of the element on the interface may be represented by using a quantity of columns included in a width of the element. The layout rule is further used to describe a correspondence between a quantity of columns included in a width of the interface and the quantity of columns included in the width of the to-be-displayed interface.

The display form is related to factors such as a screen size, a display status, a display mode, or a resolution, and the width of the to-be-displayed interface is related to factors such as the screen size, the display status, or the display mode. Therefore, in different display forms of the electronic device, widths of the displays 194 are usually different, widths of to-be-displayed interfaces on the displays 194 are usually different, and quantities of columns included in the widths of the to-be-displayed interfaces are also different. Further, according to the layout rule provided in this embodiment of this application, quantities of columns included in widths of elements on the interface are also different, and width information of elements on the interface is also different.

When determining that the interface needs to be refreshed, the processor 110 may determine the width information of the element on the interface based on a quantity of columns included in a width of an interface to be displayed after refreshing and according to the preset layout rule, so as to dynamically adjust the width of the element. In addition, in combination with a display position of the element on the interface (for example, center display, left display, or right display), a display effect of the element and the interface is dynamically adjusted.

Further, after detecting an interface refresh signal, the processor 110 may determine that the interface needs to be refreshed. For example, the electronic device detects an operation of opening an application. For example, the operation may be an operation of indicating a user to newly open an application, an operation of indicating the user to switch the application from the background to the foreground, or the like. For another example, the electronic device detects that a width of the interface changes. For example, if the screen is a foldable screen, the electronic device detects that a folding state of the foldable screen changes. For another example, the electronic device detects that a display status is switched. For another example, the electronic device detects that a display mode is switched.

In other words, an interface refresh scenario may include, for example, a scenario in which an application is newly opened (that is, an application initialization scenario), a scenario in which an application is switched from the background to the foreground, a scenario in which a landscape/portrait display state is switched, a scenario in which a folding state of a foldable screen changes, a scenario in which a full-screen/split-screen display mode is switched, a scenario of switching between a picture-in-picture display mode and another display mode, or a scenario of switching between a floating window display mode and another display mode. The interface refresh scenario refers to a scenario in which dynamic layout of the element and the interface needs to be performed.

It may be understood that when the display form of the electronic device changes, the landscape/portrait display state, the display mode, or the like of the electronic device usually also changes. A scenario in which the display status or the display mode is switched is also the interface refresh scenario. Therefore, a scenario in which the display form of the electronic device changes is usually also the interface refresh scenario.

It should be further noted that, in the following embodiments of this application, the electronic device in the posture shown in FIG. 2A is mainly used as an example for description. In this way, the width of the interface is a length of the interface in a horizontal direction, and a height of the interface is a length of the interface in a vertical direction. In addition, the width of the element is a length of the element in a horizontal direction, and a height of the element is a length of the element in a vertical direction.

In some embodiments, the layout rule may include the size of the gutter, the size of the margin, and an adjustment rule.

The size of the gutter and the size of the margin may correspond to the display form of the electronic device 100. The size of the gutter and the size of the margin in the layout rule may vary with a display form.

The adjustment rule may be used to describe a correspondence between the width information of the element on the interface and the width of the to-be-displayed interface. The application can separately specify corresponding layout rules for different elements. When the interface is refreshed, the electronic device 100 may determine, according to the adjustment rule, the width information such as the quantity of columns included in the width of the element. The electronic device 100 may further determine, based on the size of the gutter and the size of the margin in the layout rule, a dp value corresponding to the quantity of columns included in the width of the to-be-displayed element or a corresponding quantity of pixels, so as to dynamically adjust a width size of a to-be-displayed element.

For example, the layout rule may be as follows:

margin=16 dp; //indicating that the size of the margin is 16 dp; and gutter=16 dp; //indicating that the size of the gutter is 16 dp.

If the width of the to-be-displayed interface includes 4 columns, the width of the element occupies 4 columns; //indicating content of the adjustment rule.

If the width of the to-be-displayed interface includes 8 columns, the width of the element occupies 4 columns; //indicating content of the adjustment rule.

If the width of the to-be-displayed interface includes 12 columns, the width of the element occupies 5 columns; //indicating content of the adjustment rule.

In some technical solutions, the electronic device 100 may store definition information of various types of column systems. For example, configuration tables of various types of column systems are disposed on the electronic device 100. For example, the configuration table may be as follows:

```
config;
(
in the portrait display state, column = 4;
in the landscape display state, column = 8;
basic column system:
margin = 24 dp;
gutter = 24 dp;
grid column system:
margin = 24 dp;
gutter = 12 dp;
pop-up column system:
margin = 16 dp;
gutter = 16 dp;
card column system:
margin = 8 dp;
gutter = 8 dp;
...
)
```

The parameter column in this embodiment of this application indicates a column quantity, but does not indicate a width of the column. For example, column=4 indicates that the column quantity is 4.

Based on the configuration table, the sizes of the gutter and the margin in the layout rule may be represented by the column system type. For example, the layout rule may be as follows:

pop-up column system; //a margin of the pop-up column system is 16 dp, and a gutter is 16 dp;

if the width of the to-be-displayed interface includes 4 columns, the width of the element occupies 4 columns;

if the width of the to-be-displayed interface includes 8 columns, the width of the element occupies 4 columns; and if the width of the to-be-displayed interface includes 12 columns, the width of the element occupies 5 columns.

In some other embodiments, the layout rule may include the adjustment rule, and does not include the size of the gutter and the size of the margin. The application may specify corresponding layout rules for different elements. The electronic device 100 may dynamically adjust the width of the element according to the layout rule. The application can further specify the size of the gutter and the size of the margin. For example, different elements may have different gutter sizes or margin sizes. Alternatively, different types of elements may have different gutter sizes or margin sizes, and elements of a same type may have a same gutter size and margin size (that is, use a same type of column system). Alternatively, different interfaces may have different gutter sizes or margin sizes, and a same interface may have a same gutter size and margin size. Alternatively, interfaces of a same application may have a same gutter size and margin size.

The layout rule may exist in a plurality of forms on the electronic device 100. For example, the layout rule may be written in a description file, and after the electronic device 100 is started, the layout rule in the description file may be parsed.

For another example, the layout rule may also be encapsulated in a function. A corresponding static variable can be predefined for each set of layout rules to facilitate function invocation. For example, a static variable corresponding to the layout rule can be macro-defined.

TYPE_TOAST=0; //a set of layout rules applied to a pop-up window is macro-defined;

TYPE_BUBBLE=1; //a set of layout rules applied to a bubble is macro-defined;

TYPE_xxxx=2;

For example, an encapsulation function used to encapsulate the layout rule may be as follows:

```
getLayoutSize(int type) {//indicating that the width of the element is obtained;
    If (type == TYPE_TOAST) {//indicating that a layout rule corresponding to TYPE_TOAST is invoked;
        If (Column == 4) result = 4; //indicating that if the to-be-displayed interface includes 4 columns, the width of the element occupies 4 columns;
        Else If (Column == 8) result = 4; //indicating that if the to-be-displayed interface includes 8 columns, the width of the element occupies 4 columns;
        Else If (Column == 12) result =5; //indicating that if the to-be-displayed interface includes 12 columns, the width of the element occupies 5 columns;
    }
    If (type == TYPE BUBBLE) {//indicating that a layout rule corresponding to TYPE_BUBBLE is invoked;
        ...
    }
    If (type == TYPE_xxxx) {//indicating that a layout rule corresponding to TYPE_xxxx is invoked;
        ...
    }
    Return Column2Dp(result)
}
```

In the encapsulation function, Column represents the quantity of columns included in the width of the to-be-displayed interface. Result represents the quantity of columns included in the width of the element. Return Column2Dp(result) represents that a quantity of columns included in a width of an obtained pop-up window is converted into a dp value, so as to be drawn and displayed on the display 194.

The width information of the element may alternatively be represented by using another parameter, for example, may alternatively be represented by using a dp value of the width of the element. In the example of the encapsulation function, the layout rule is used to describe a correspondence between the dp value of the width of the element on the interface and the quantity of columns included in the width of the to-be-displayed interface.

It should be noted that, an example in which the layout rule in the foregoing encapsulation function includes the adjustment rule but does not include the sizes of the margin and the gutter is used for description. It may be understood that, the layout rule in the encapsulation function may also include the sizes of the margin and the gutter. Details are not described herein. For example, the encapsulation function further includes a getMargin0 function that is used to obtain the size of the margin and a getGutter{ } function that is used to obtain the size of the gutter.

According to the foregoing layout rule, the electronic device 100 may implement dynamic layout of elements in a plurality of manners.

In addition, the electronic device 100 may further implement audio functions, for example, music playing and recording, by using the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may be further configured to code and decode an audio signal. In some embodiments, the audio module 170 may be disposed in the processor 110, or some function modules of the audio module 170 are disposed in the processor 110.

The speaker 170A, also referred to as a "loudspeaker", is configured to convert an audio electrical signal into a sound signal. The electronic device 100 may be configured to listen to music or answer a hands-free call by using the speaker 170A.

The receiver 170B, also referred to as an "earpiece", is configured to convert an audio electrical signal into a sound signal. When a call is answered or audio information is listened to by using the electronic device 100, the receiver 170B may be put close to a human ear to listen to a voice.

The microphone 170C, also referred to as a "mike" or a "mic", is configured to convert a sound signal into an electrical signal. When making a call or sending voice information, a user may make a sound by moving a human mouth close to the microphone 170C to input a sound signal to the microphone 170C. At least one microphone 170C may be disposed in the electronic device 100. In some other embodiments, two microphones 170C may be disposed in the electronic device 100, to collect a sound signal and implement a noise reduction function. In some other embodiments, three, four, or more microphones 170C may alternatively be disposed in the electronic device 100, to collect a sound signal, implement noise reduction, and identify a sound source, so as to implement a directional recording function and the like.

The headset jack 170D is configured to connect to a wired headset. The headset jack 170D may be the USB interface 130, or may be a 3.5 millimeters (mm) Open Mobile Terminal Platform (OMTP) standard interface or a cellular telecommunications industry association of the United States of America (USA) (CTIA) standard interface.

The pressure sensor 180A is configured to sense a pressure signal, and can convert the pressure signal into an electrical signal. In some embodiments, the pressure sensor 180A may be disposed on the display 194. There is a plurality of types of pressure sensors 180A, for example, a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure intensity based on a capacitance change. When a touch operation is performed on the display 194, the electronic device 100 detects a strength of the touch operation through the pressure sensor 180A. The electronic device 100 may calculate a touch location based on a detection signal of the pressure sensor 180A. In some embodiments, touch operations that are performed at a same touch location but have different touch operation intensity may correspond to different operation instructions. For example, when a touch operation whose touch operation intensity is less than a first pressure threshold is performed on a messages icon, an instruction for viewing Short Message Services (SMS) message is executed. When a touch operation whose touch operation intensity is greater than or equal to the first pressure threshold is performed on an SMS message application icon, an instruction for creating an SMS message is executed.

The gyroscope sensor 180B may be configured to determine a motion posture of the electronic device 100. In some embodiments, an angular velocity of the electronic device 100 around three axes (namely, axes x, y, and z) may be determined through the gyroscope sensor 180B. The gyroscope sensor 180B may be configured to perform image stabilization during photographing. For example, when a shutter is pressed, the gyroscope sensor 180B detects an angle at which the electronic device 100 jitters, calculates, based on the angle, a distance for which a lens module needs to compensate, and allows the lens to cancel the jitter of the electronic device 100 through reverse motion, to implement image stabilization. The gyroscope sensor 180B may be further used in a navigation scenario and a motion-sensing game scenario.

In some embodiments, the gyroscope sensor 180B may be configured to detect rotation of the electronic device 100, so as to detect whether a scenario in which the interface needs to be refreshed, for example, the landscape/portrait display state of the electronic device 100 is switched occurs. In this way, the electronic device 100 performs dynamic layout on the element and the interface in the interface refresh scenario.

The barometric pressure sensor 180C is configured to measure barometric pressure. In some embodiments, the electronic device 100 calculates an altitude based on a value of the barometric pressure measured by the barometric pressure sensor 180C, to assist in positioning and navigation.

The magnetic sensor 180D includes a Hall effect sensor. The electronic device 100 may detect opening and closing of a flip cover or a leather case by using the magnetic sensor 180D. In some embodiments, when the electronic device 100 is a clamshell phone, the electronic device 100 may detect opening and closing of a flip cover by using the magnetic sensor 180D. Further, a feature such as automatic unlocking upon opening of the flip cover is set based on a detected opening or closing state of the leather case or a detected opening or closing state of the flip cover.

The acceleration sensor 180E may detect accelerations in various directions (usually on three axes) of the electronic device 100, and may detect magnitude and a direction of gravity when the electronic device 100 is still. The acceleration sensor 180E may be further configured to identify a posture of the electronic device, and is used in an application such as switching between a landscape mode and a portrait mode or a pedometer.

The distance sensor 180F is configured to measure a distance. The electronic device 100 may measure the distance in an infrared manner or a laser manner. In some embodiments, in a photographing scenario, the electronic device 100 may measure a distance by using the distance sensor 180F to implement quick focusing.

The optical proximity sensor 180G may include, for example, an LED and an optical detector such as a photodiode. The light-emitting diode may be an infrared light-emitting diode. The electronic device 100 emits infrared light by using the light-emitting diode. The electronic device 100 detects infrared reflected light from a nearby object by using the photodiode. When sufficient reflected light is detected, the electronic device 100 may determine that there is an object near the electronic device 100. When insufficient reflected light is detected, the electronic device 100 may determine that there is no object near the electronic device 100. The electronic device 100 may detect, by using the optical proximity sensor 180G, that the user holds the electronic device 100 close to an ear for a call, to automatically perform screen-off to save power. The optical proximity sensor 180G may also be used in a leather case mode or a pocket mode to automatically unlock or lock a screen.

The ambient light sensor 180L is configured to sense ambient light brightness. The electronic device 100 may adaptively adjust brightness of the display 194 based on the sensed ambient light brightness. The ambient light sensor 180L may also be configured to automatically adjust a white balance during photographing. The ambient light sensor 180L may further cooperate with the optical proximity sensor 180G to detect whether the electronic device 100 is in a pocket, to prevent an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy based on the temperature detected by the temperature sensor 180J. For example, when the temperature reported by the temperature sensor 180J exceeds a threshold, the electronic device 100 lowers performance of a processor located near the temperature sensor 180J, to reduce power consumption to implement thermal protection. In some other embodiments, when the temperature is less than another threshold, the electronic device 100 heats the battery 142 to prevent the electronic device 100 from being shut down abnormally due to a low temperature. In some other embodiments, when the temperature is less than still another threshold, the electronic device 100 boosts an output voltage of the battery 142, to avoid abnormal shutdown due to a low temperature.

The touch sensor 180K is also referred to as a touch panel. The touch sensor 180K may be disposed in the display 194, and the touch sensor 180K and the display 194 form a touchscreen, which is also referred to as a "touch screen". The touch sensor 180K is configured to detect a touch operation performed on or near the touch sensor 180K. The touch sensor may transfer the detected touch operation to the application processor, to determine a type of a touch event. Visual output related to the touch operation may be provided on the display 194. In some other embodiments, the touch sensor 180K may alternatively be disposed on a surface of the electronic device 100 at a location different from a location of the display 194.

In some embodiments, the touch sensor 180K may detect an operation of tapping an application icon by the user, so that the electronic device 100 determines that a current scenario is an application opening scenario, and therefore determines that the current scenario is the interface refresh scenario. In this way, the electronic device 100 performs dynamic layout on the element and the interface in the interface refresh scenario.

The bone conduction sensor 180M may obtain a vibration signal. In some embodiments, the bone conduction sensor 180M may obtain a vibration signal of a vibration bone of a human vocal part. The bone conduction sensor 180M may also be in contact with a human pulse, to receive a blood pressure beating signal. In some embodiments, the bone conduction sensor 180M may also be disposed in the headset, to obtain a bone conduction headset. The audio module 170 may obtain a voice signal through parsing based on the vibration signal that is of the vibration bone of the vocal-cord part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device 100 may receive a key input, and generate a key signal input related to a user setting and function control of the electronic device 100.

The motor 191 may generate a vibration prompt. The motor 191 may be configured to produce an incoming call vibration prompt and a touch vibration feedback. For example, touch operations performed on different applications (for example, photographing and audio playing) may correspond to different vibration feedback effects. The motor 191 may also correspond to different vibration feedback effects for touch operations performed on different areas of the display 194. Different application scenarios (for example, a time reminder scenario, an information receiving scenario, an alarm clock scenario, and a game scenario) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards may be simultaneously inserted into a same SIM card interface 195. The plurality of cards may be of a same type or different types. The SIM card interface 195 may be compatible with different types of SIM cards. The SIM card interface 195 may also be compatible with an external storage card. The electronic device 100 interacts with a network through the SIM card, to implement functions such as calling and data communication. In some embodiments, the electronic device 100 uses an embedded-SIM (eSIM), namely, an embedded SIM card. The eSIM card may be embedded into the electronic device 100, and cannot be separated from the electronic device 100.

It may be understood that the structure shown in this embodiment of this application does not constitute a specific limitation on the electronic device 100. In other embodiments of this application, the electronic device 100 may include more or fewer components than those shown in the figure, combine some components, split some components, or have different component arrangements. The components shown in the figure may be implemented by hardware, software, or a combination of software and hardware.

In this embodiment of this application, column system division may be performed on the display 194. The internal memory 121 may store the layout rule. The layout rule may be used to describe a correspondence between the width information of the element on the to-be-displayed interface and the quantity of columns included in the width of the to-be-displayed interface in the current display form. A detection component in the electronic device 100 (such as the gyroscope sensor 180B or the touch sensor 180K) may assist the electronic device 100 in detecting whether the interface needs to be refreshed currently. When the application refreshes the interface, the processor 110 may determine the width information of the element on the to-be-displayed interface based on the quantity of columns included in the width of the to-be-displayed interface in the current display form and the correspondence, and further perform dynamic layout of the elements. Therefore, the application can adapt to different display forms, and implement different interface layout effects.

Figure 3:
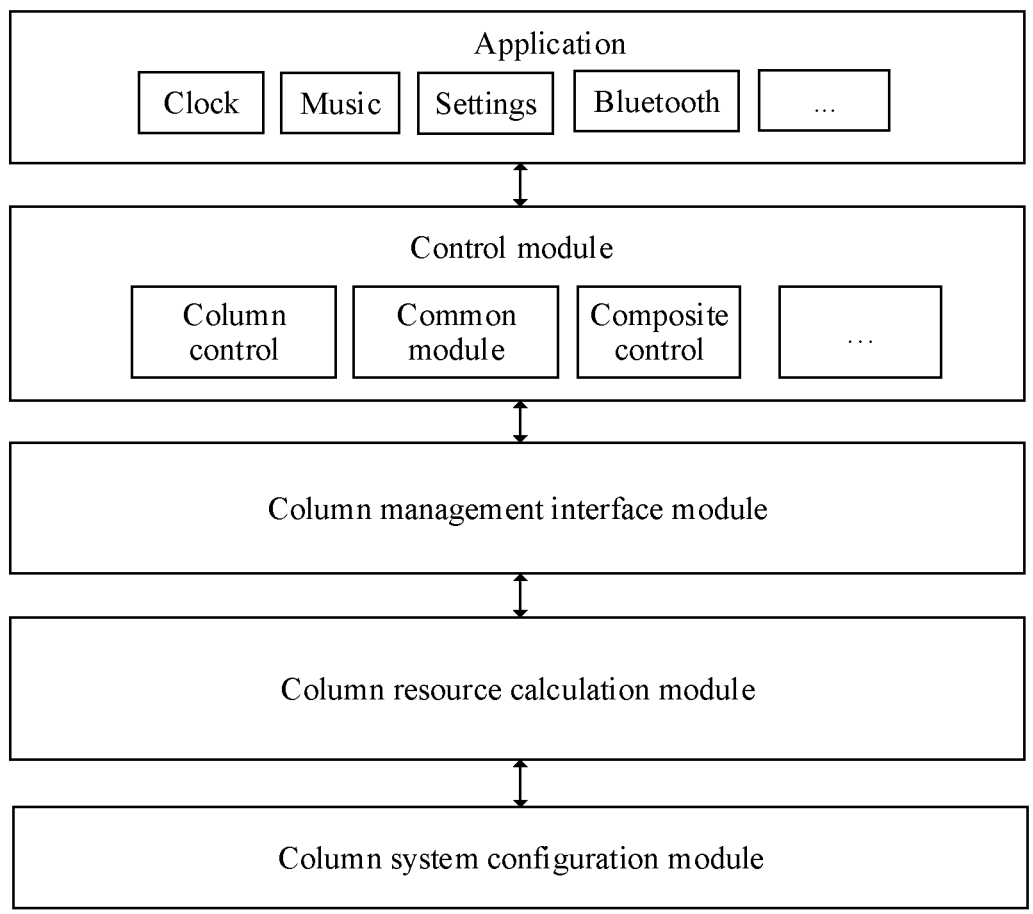
FIG. 3 is a schematic diagram of modules of a software system according to an embodiment of this application.

A software system of the electronic device may use a layered architecture, an event-driven architecture, a micro-kernel architecture, a microservice architecture, or a cloud architecture. In this embodiment of this application, the layered architecture shown in FIG. 3 is used as an example to describe a software structure of the electronic device 100.

In a layered architecture, software is divided into several layers, and each layer has a clear role and task. The layers communicate with each other through a software interface. In some embodiments, a software system of the electronic device is divided into four layers of modules, which are respectively an application, a control module, a column management interface module, a column resource calculation module, and a column system configuration module from top to bottom.

The application may include a series of application packages. As shown in FIG. 3, the application package may include applications such as clock, settings, BT, music, camera, gallery, calendar, phone, map, navigation, WLAN, videos, messages, or WECHAT.

The control module may be configured to provide elements such as a column control, a general template, and a composite control. When an interface needs to be refreshed, the control module can obtain information such as a width of an element and a size of a margin through a column system management interface. Then, the control module can rearrange a size of the element, relative positions of a plurality of elements in the composite control, or the like.

The column management interface module may be configured to obtain screen parameter information corresponding to a current display form, for example, a screen resolution, a display mode, or a size of a screen width, and set the screen parameter information to the column resource calculation module. When the electronic device is in a non-full-screen display mode such as a split-screen display mode, the column management interface module may obtain parameter information of a current sub-screen based on the screen parameter information corresponding to the current display form, and set the parameter information to the column resource calculation module.

The screen may be the display 194 shown in FIG. 1, or may be a touchscreen including the display 194 and the touch sensor 180K shown in FIG. 1.

The column management interface module may further provide the control module with invoking of an API interface and a layout rule, and return the width of the element to the control module, for example, a dp value corresponding to the width of the element or a quantity of pixels corresponding to the width of the element.

The column resource calculation module may be configured to receive scheduling from a column management system interface, obtain related configuration information in the column system configuration module based on the screen parameter information corresponding to the current display form and the layout rule, and calculate a width of a column and the width of the element.

The column system configuration module is configured to provide related configuration information of a column system, for example, a first column quantity, a second column quantity, a size of a gutter, and the size of the margin. The first column quantity is a quantity of columns included in a width of a to-be-displayed interface. The second column quantity is a quantity of columns included in a width of an element on the to-be-displayed interface.

The software module shown in FIG. 3 and the hardware module shown in FIG. 1 may cooperate with each other, to implement the dynamic interface layout method for the electronic device provided in this embodiment of this application.

It may be understood that the software system of the electronic device may have different module division manners, or may include different software modules. An operation performed by the electronic device is an operation performed by different software modules of the electronic device, and an operation performed by the software module of the electronic device is an operation performed by the electronic device.

Figure 4:
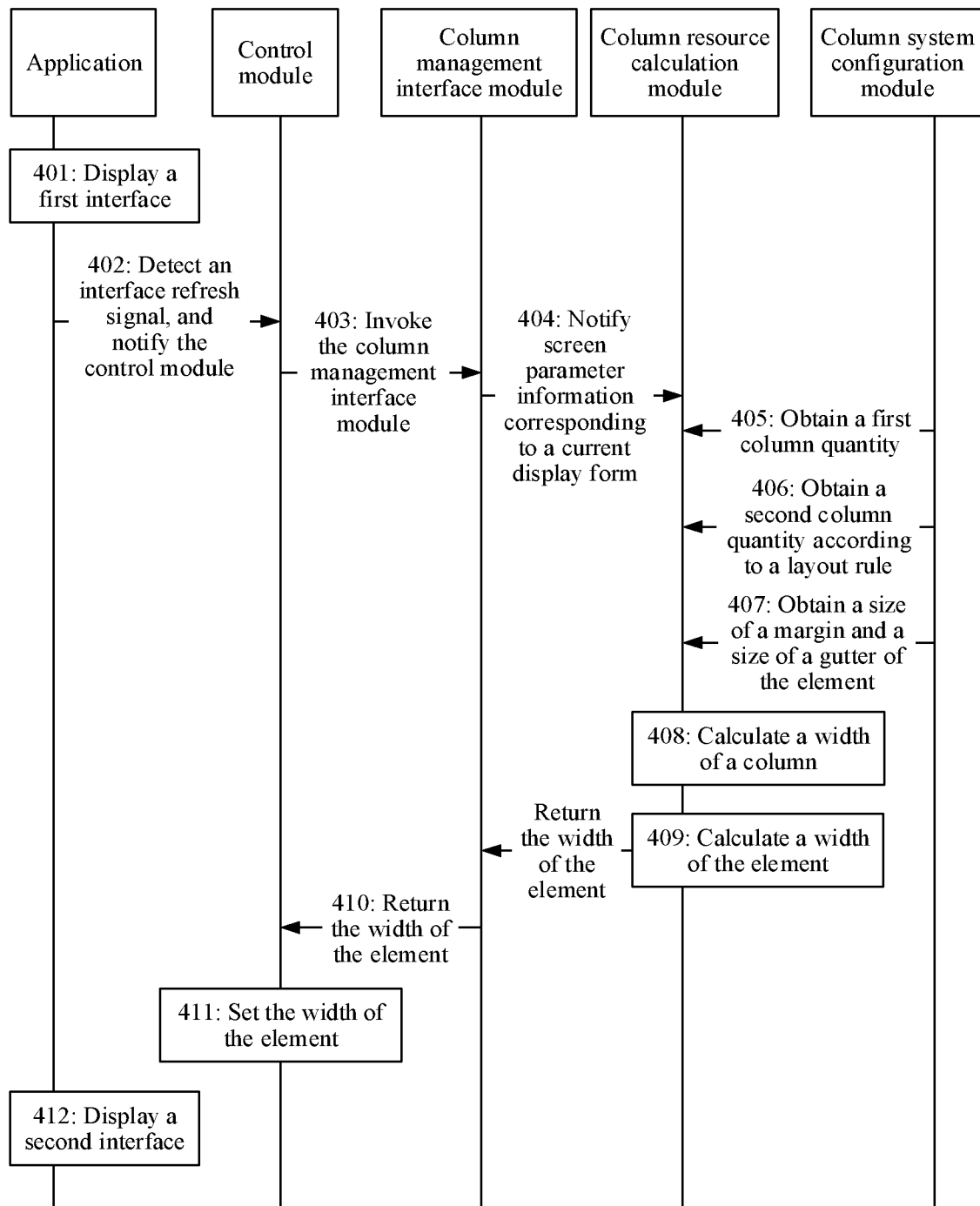
FIG. 4 is a flowchart of a dynamic interface layout method according to an embodiment of this application.

The following mainly describes, from the perspective of the software module shown in FIG. 3, a dynamic interface layout method for an electronic device provided in this embodiment of this application. Refer to FIG. 4. The method may include the following steps.

401: An application displays a first interface.

The application may be a system application, or may be a third-party application. For example, the system application may include a desktop application, a settings application, a messages application, a clock application, or the like, and the third-party application may include a WECHAT application, a browser application, a WEIBO application, a navigation application, or the like.

402: The application detects an interface refresh signal, and notifies a control module.

For descriptions of interface refreshing, refer to related descriptions in the foregoing embodiments.

403: The control module invokes a column management interface module to obtain a width of an element.

For example, the width of the element may be size information such as a quantity of pixels corresponding to the width of the element, or a dp value corresponding to the width of the element.

404: The column management interface module obtains screen parameter information corresponding to a current display form, and notifies the screen parameter information corresponding to the current display form to a column resource calculation module.

The screen parameter information may include information such as a screen resolution, a display mode, or a size of a screen width.

405: The column resource calculation module obtains, from a column system configuration module, a first column quantity corresponding to a width of a to-be-displayed second interface in the current display form.

A display form is related to a factor such as a screen size, a display status, a display mode, or a resolution, and a width of a to-be-displayed interface is also generally related to a factor such as the screen size, the display status, or the display mode. Therefore, in different display forms, widths of to-be-displayed interfaces are usually different, and first column quantities are also different. The first column quantity is configured in the column system configuration module, and the column resource calculation module may obtain, in real time from the column system configuration module, the first column quantity corresponding to the width of the to-be-displayed second interface in the current display form.

406: The column resource calculation module obtains, from the column system configuration module according to a layout rule corresponding to an element on the to-be-displayed second interface, a second column quantity corresponding to the first column quantity.

The second column quantity is configured in the column system configuration module, and the column resource calculation module obtains, from the column system configuration module according to the layout rule corresponding to the element, the second column quantity corresponding to the first column quantity.

407: The column resource calculation module obtains, from the column system configuration module according to the layout rule corresponding to the element on the to-be-displayed second interface, a size of a margin and a size of a gutter that are corresponding to the element.

The layout rule corresponding to the element specifies the size of the margin and the size of the gutter, and the size of the margin and the size of the gutter are configured in the column system configuration module.

408: The column resource calculation module calculates a width of a column based on the screen parameter information corresponding to the current display form, the first column quantity, the size of the margin, and the size of the gutter.

The column resource calculation module may calculate the width of the column in a column system based on the screen parameter information corresponding to the current display form, the first column quantity in the column system, the size of the margin, and the size of the gutter. The width of the column may be a dp value corresponding to the width of the column, or a quantity of pixels corresponding to the width of the column.

409: The column resource calculation module calculates the width of the element based on the width of the column and the second column quantity, and returns the width of the element to the column management interface module.

The width of the element matches the second column quantity. The width of the element further includes a sum of widths of columns of the second column quantity and a sum of sizes of gutters corresponding to the columns of the second column quantity.

410: The column management interface module returns the width of the element to the control module.

411: The control module sets a width of the element based on the obtained width of the element.

The width of the element set by the control module is consistent with the width of the element obtained by the control module.

412: The application displays the second interface, where a width of an element on the second interface is the width of the element set by the control module.

In this way, the application can dynamically set the width of the element, so as to perform dynamic layout of the element and the interface on which the element is located.

The dynamic interface layout method shown in FIG. 4 is described below by using an example.

In some embodiments, the control module may provide some column controls. Each type of column control may correspond to a corresponding layout rule. For example, the column control may include a column pop-up window, a column bubble, a column button, a column card, or the like.

The application can specify the use of these column controls during interface design. When the application determines that the interface is refreshed (that is, in an interface refresh scenario), if an interface to be displayed after refreshing includes the column control, the column control in the control module may dynamically lay out a width of the column control based on the current display form and according to a layout rule corresponding to the column control. A height of the column control may be determined based on an amount of to-be-displayed content (that is, an information amount of the to-be-displayed content) of the column control, so that the column control is enabled to accommodate to-be-displayed content specified by the application.

Further, in the interface refresh scenario, an operating system may notify the application, and the application may notify the column control. The column control may determine width information of the column control based on the width of the to-be-displayed interface corresponding to the current display form and according to the layout rule corresponding to the column control, so as to dynamically set the width of the column control, and implement dynamic layout of the column control and the interface.

The width information of the column control may include information such as a quantity of columns included in the width of the column control, a dp value corresponding to the width of the column control, and a quantity of pixels corresponding to the width of the column control. The column control may determine, based on the quantity of columns included in the width of the to-be-displayed interface corresponding to the current display form and the layout rule corresponding to the column control, the quantity of columns included in the width of the column control. The column control may further determine the width of the column based on the size of the gutter and the size of the margin in the layout rule, to determine the information such as the dp value or the quantity of pixels corresponding to the width of the column control. The dp value or the quantity of pixels corresponding to the width of the column control may be used to indicate an actual width of the column control, so that the application displays the column control on a screen.

In addition, a position of the column control on the interface is specified by the application. With reference to the display position of the column control specified by the application on the interface and the dynamically determined width information of the column control, the application may dynamically control a display effect of the column control. For example, the application may specify the position of the column control on the interface to be left display, right display, or center display, a distance between a left boundary of the column control and a left boundary of the screen, or a distance between an upper boundary of the column control and an upper boundary of the screen.

For example, the column control is the column pop-up window. For example, a layout rule corresponding to the column pop-up window may be as follows:

margin=16 dp;

gutter=16 dp;

if the width of the to-be-displayed interface includes 4 columns, a width of the column pop-up window occupies 4 columns;

if the width of the to-be-displayed interface includes 8 columns, and a ratio of the width to a height of the to-be-displayed interface is greater than 4:3, the width of the column pop-up window occupies 4 columns;

if the width of the to-be-displayed interface includes 8 columns, and the ratio of the width to the height of the to-be-displayed interface is less than or equal to 4:3, the width of the column pop-up window occupies 5 columns; and if the width of the to-be-displayed interface includes 12 columns, the width of the column pop-up window occupies 5 columns.

For example, the application is an App Store, the electronic device is a mobile phone, and the mobile phone is in a portrait display state. After detecting that a user taps an icon of the App Store shown in FIG. 5A, the mobile phone opens the App Store. An operating system notifies the App Store to run. The App Store needs to prompt the user that a new version is found. The App Store specifies to use a column pop-up window to prompt the user that the new version is found.

After the App Store starts to run, the App Store is initialized and the column pop-up window is notified to refresh an interface (that is, an interface refresh scenario is currently displayed). The interface refresh scenario herein refers to a scenario of switching from not displaying an interface of the App Store to displaying the interface of the App Store during initialization.

Then, the column pop-up window may obtain a width of the column pop-up window by using the method described in step 403 to step 411. The application displays the column pop-up window based on width information of the column pop-up window and a position of the pop-up window. To-be-displayed content in the column pop-up window is specified by the App Store.

For example, in the portrait display state, by using the method described in step 403 to step 411, the column pop-up window may invoke a column management interface module. The column management interface module obtains screen parameter information corresponding to a current display form, and notifies the screen parameter information corresponding to the current display form to a column resource calculation module. Then, the column resource calculation module may obtain, from a column system configuration module, a first column quantity corresponding to a width of a to-be-displayed interface in the current display form. The first column quantity is 4. The column resource calculation module obtains, from the column system configuration module according to a layout rule corresponding to the column pop-up window on a to-be-displayed second interface, a second column quantity corresponding to the first column quantity. The second column quantity is 4. The column resource calculation module obtains, from the column system configuration module according to the layout rule corresponding to the column pop-up window on the to-be-displayed second interface, a size of a margin and a size of a gutter that are corresponding to the column pop-up window. The size of the margin is 16 dp, and the size of the gutter is 16 dp. The column resource calculation module calculates a width of a column based on the screen parameter information corresponding to the current display form, the first column quantity, the size of the margin, and the size of the gutter. The column resource calculation module calculates the width of the column pop-up window based on the width of the column and the second column quantity, and returns the width of the column pop-up window to the column management interface module. The column management interface module returns the width of the column pop-up window to a control module. The control module sets a width of the column pop-up window based on the obtained width of the column pop-up window.

In addition, displayed content in the column pop-up window is used to prompt the user that information about the new version is found. A height of the column pop-up window is determined based on an amount of displayed content in the column pop-up window, so that the column pop-up window is enabled to accommodate displayed content specified by the App Store. If a display position of the column pop-up window specified by the App Store is center, for a display effect of the column pop-up window, refer to FIG. 5B. As shown in FIG. 5B, the width of the column pop-up window occupies 4 columns. The width of the column pop-up window includes widths of 4 adjacent columns, and sizes of 3 gutters between the 4 columns.

Figure 5A:
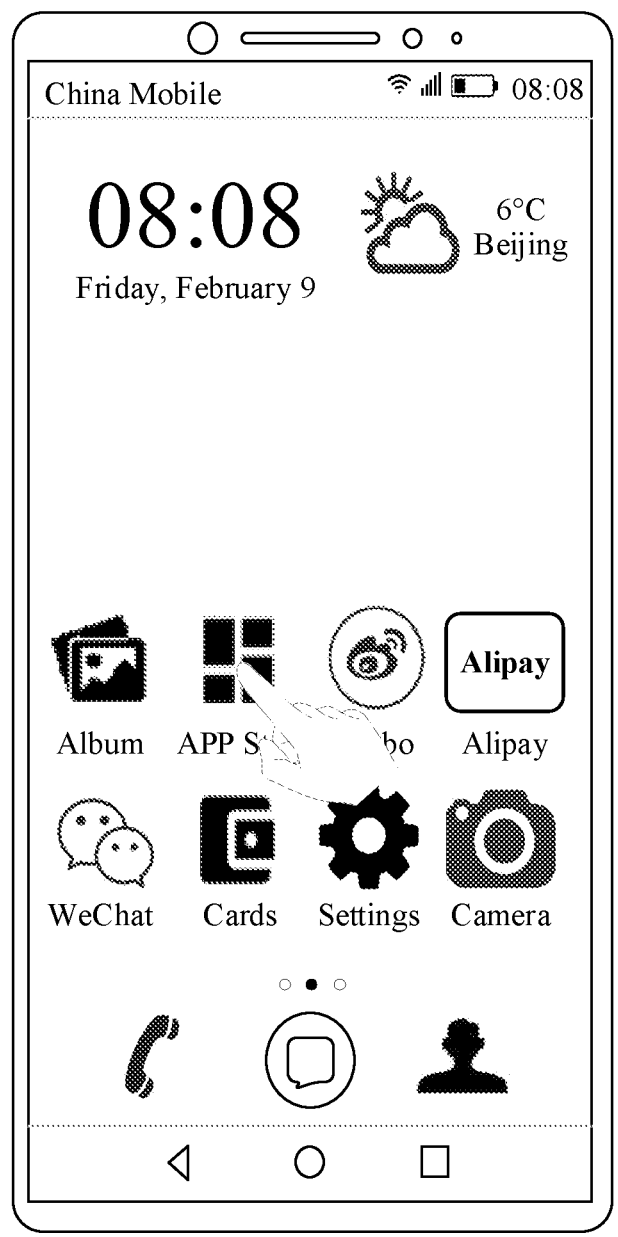
FIG. 5A, FIG. 5B, and FIG. 5C are a schematic diagram of an effect of a group of dynamic interface layout according to an embodiment of this application.
Figure 5B:
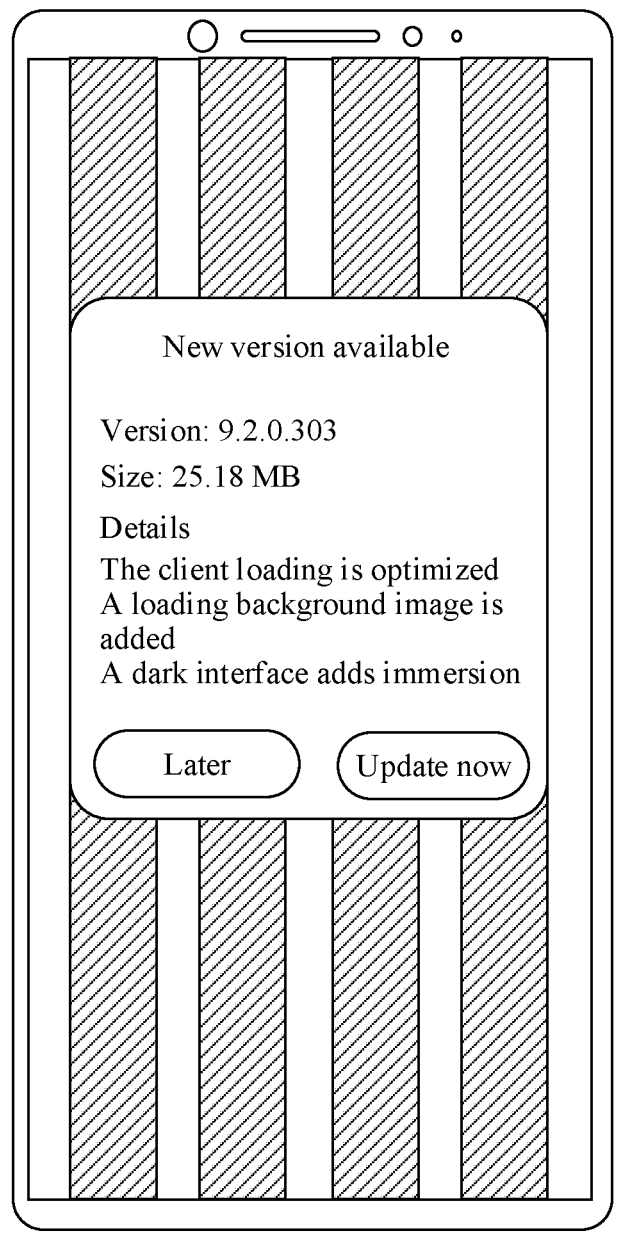

The interface shown in FIG. 5A may be a first interface, and the interface shown in FIG. 5B may be a second interface displayed after the first interface is refreshed.

In some embodiments, the column control may include a resizable attribute. The application may specify that the resizable attribute of the column control is true or false. If the application specifies that the resizable attribute of the column control is true when the interface is refreshed, the column control obtains the width of the column control according to the layout rule and resets the width of the column control. For example, in the foregoing App Store scenario, when the interface is refreshed, if a resizable attribute of the column pop-up window is true, the column pop-up window determines the width of the column pop-up window according to a corresponding layout rule.

Figure 5C:

In the foregoing App Store scenario, after the mobile phone displays the interface shown in FIG. 5B, if the user rotates the mobile phone, and the mobile phone switches from the portrait display state to a landscape display state, the column management interface module may obtain the screen parameter information corresponding to the current display status, and update the information to the column resource calculation module, so that the column resource calculation module performs related calculation based on the current display form. For example, the column management interface module may obtain display configuration information such as a quantity of pixels, a dp value, or a quantity of columns corresponding to a width of to-be-displayed interface whose display form changes. The operating system notifies the App Store that the display form changes. The App Store notifies the column pop-up window to refresh the interface. The column pop-up window invokes the column management interface module, the column resource calculation module, and the column system configuration module by using the method shown in step 403 to step 411, so as to determine the width information of the column pop-up window based on the first column quantity corresponding to the current display form and according to the layout rule. For example, in the landscape display state, a height and the width of the to-be-displayed interface on the mobile phone are consistent with a height and a width of a screen, the width of the to-be-displayed interface includes 8 columns, and a ratio of the width to the height of the to-be-displayed interface is greater than 4:3. Therefore, according to the layout rule of the column pop-up window, as shown in FIG. 5C, the width of the column pop-up window occupies 4 columns. The interface shown in FIG. 5B may be the first interface, and the interface shown in FIG. 5C may be the second interface.

It should be noted that, in a full-screen display mode, the width of the to-be-displayed interface is equal to the width of the screen, and the height of the to-be-displayed interface is equal to the height of the screen. Therefore, in the full-screen display mode, a correspondence between a quantity of columns included in a width of an element on the interface described in the layout rule and a quantity of columns included in the width of the to-be-displayed interface may also be referred to as a correspondence between a quantity of columns included in the width of the element on the interface and a quantity of columns included in the width of the screen.

Figure 6A:
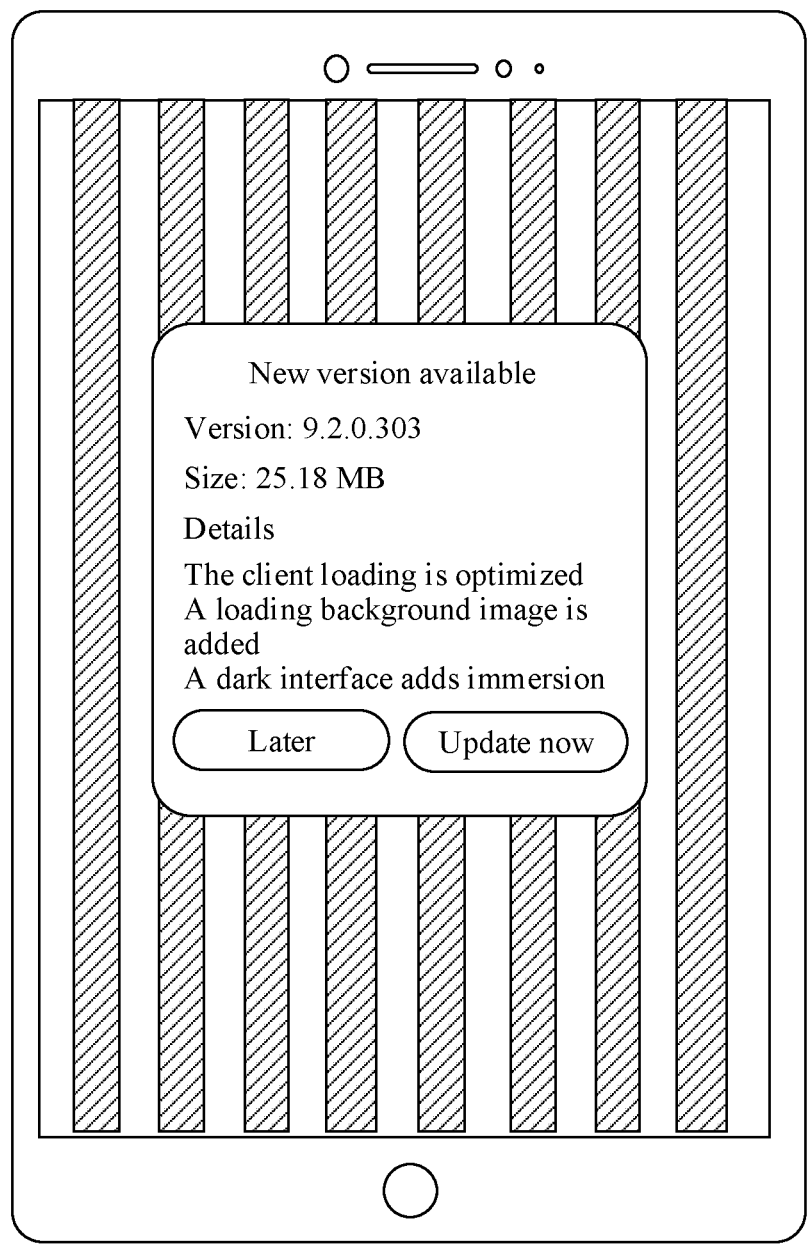
FIG. 6A and FIG. 6B are a schematic diagram of an effect of another group of dynamic interface layout according to an embodiment of this application.

For another example, the electronic device is a tablet computer, and a display form of the tablet computer is different from a display form of the mobile phone. After detecting that a user taps an icon of an App Store, the tablet computer starts running and opens the App Store. If the tablet computer is currently in a portrait display state, in the current display status, a width of a screen and an interface of the tablet computer occupies 8 columns, and a ratio of the width to a height of the screen and the interface is less than or equal to 4:3, according to a layout rule of a column pop-up window, as shown in FIG. 6A, because a second column quantity is an odd number, and a position of the column pop-up window is center, left and right sides of the column pop-up window respectively occupy half of columns, and the column pop-up window overlaps 6 columns. However, the column pop-up window includes 5 columns, in other words, the column pop-up window occupies 5 complete column widths. A width of the column pop-up window includes a sum of widths of 5 columns, and a sum of sizes of 5 gutters between 6 overlapping columns.

It should be noted that the application may specify a display position of the column pop-up window, and may further notify a column resource calculation module of the display position of the column pop-up window. The column resource calculation module may calculate the width of the column pop-up window based on the display position, a second column quantity, a width of a column, and a size of a gutter.

For example, if the second column quantity is 5, and the display position of the column pop-up window specified by the application is left, the column pop-up window starts from a first column on the left of the screen and occupies 5 columns to the right. The width of the column pop-up window is a sum of widths of 5 columns and sizes of 4 gutters between the 5 columns.

For another example, if the second column quantity is 5, and the display position of the column pop-up window specified by the application is right, the column pop-up window starts from a first column on the right of the screen and occupies 5 columns to the left. The width of the column pop-up window is a sum of widths of 5 columns and sizes of 4 gutters between the 5 columns.

For another example, if the second column quantity is 5, and the display position of the column pop-up window specified by the application is center, the column pop-up window is displayed in the center of the screen. The left and right sides of the column pop-up window respectively occupy half of columns. The column pop-up window overlaps 6 columns, and there are 5 gutters between the 6 columns. However, the column pop-up window includes 5 columns, in other words, the column pop-up window occupies 5 complete column widths. The width of the column pop-up window is a sum of widths of 5 columns and sizes of 5 gutters.

Figure 6B:
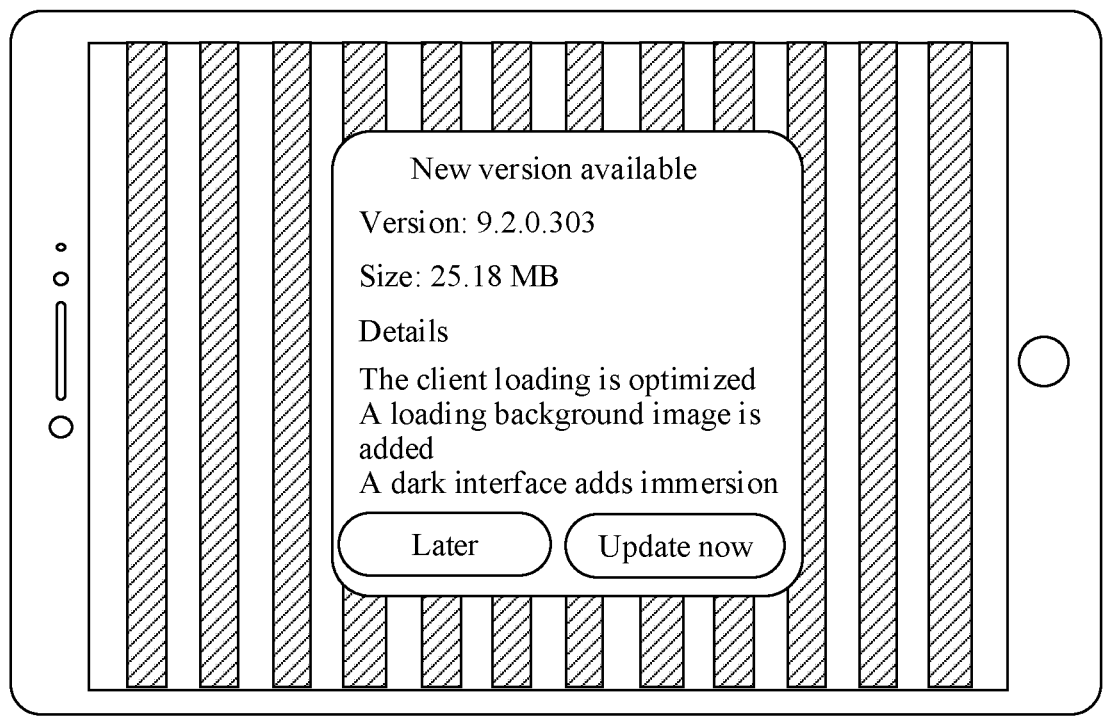

If the user rotates the tablet computer, and the tablet computer switches from the portrait display state to a landscape display state, the display form changes. In the landscape display state, a screen width of the tablet computer and a width of a to-be-displayed interface occupy 12 columns. Therefore, according to the layout rule of the column pop-up window, as shown in FIG. 6B, the width of the column pop-up window occupies 5 columns.

The foregoing uses a scenario in which the column pop-up window is used to prompt that a new version is found as an example for description. The column pop-up window may also be used in another scenario. For example, the column pop-up window may be further used in a scenario in which the user is prompted of a low battery level, or a scenario in which the user is prompted whether to connect to a network, or the like.

For another example, the column control is a column bubble. For example, a layout rule corresponding to the column bubble may be as follows:
    margin=24 dp;
    gutter=24 dp;
    if the width of the to-be-displayed interface includes 4 columns, a width of the column bubble may occupy up to 4 columns;
    if the width of the to-be-displayed interface includes 6 columns, the width of the column bubble may occupy up to 4 columns;
    if the width of the to-be-displayed interface includes 8 columns, the width of the column bubble may occupy up to 6 columns;
    if the width of the to-be-displayed interface includes 12 columns, the width of the column bubble may occupy up to 6 columns; and
    the width of the column bubble occupies a minimum of 2 columns.

For example, the application is WECHAT, the electronic device is a tablet computer, and the tablet computer is in a portrait display state. The tablet computer displays a WECHAT chat interface. The WECHAT chat interface includes a message bubble. WECHAT specifies that the message bubble is a column bubble. In the portrait display state, widths of a screen and an interface of the tablet computer include 8 columns, and according to a layout rule of the column bubble, a second column quantity of the column bubble is 6. It should be noted that the second column quantity of the column bubble is a maximum quantity of columns that can be included in a width of the column bubble. For aesthetic purposes, the width of the column bubble occupies a minimum of 2 columns. An actual width of the column bubble can be adaptively adjusted between a minimum width and a maximum width depending on an amount of message content. If WECHAT specifies that a display position of the column bubble is right, for a display effect of the column bubble, refer to FIG. 7A.

If a user rotates the tablet computer, and the tablet computer switches from the portrait display state to a landscape display state, an operating system notifies WECHAT that a display form changes, and WECHAT notifies the column bubble to refresh the interface. The column bubble invokes a column management interface module, a column resource calculation module, and a column system configuration module by using the method shown in step 403 to step 411, so as to determine width information of the column bubble based on a first column quantity corresponding to a current display form and according to the layout rule of the column bubble. In the landscape display state, widths of a screen and a to-be-displayed interface of the tablet computer include 12 columns, and according to the layout rule of the column bubble, the width of the column bubble occupies a maximum of 6 columns. For a display effect of the column bubble, refer to FIG. 7B.

Then, if the tablet computer detects an operation that the user indicates to enter a split-screen display mode, the operating system notifies WECHAT that the display form changes, and WECHAT notifies the column bubble to refresh the interface. In the split-screen display mode, the tablet computer includes two sub-screens that are respectively configured to display two different interfaces. For example, one sub-screen is configured to display an interface of WECHAT, and the other sub-screen displays an interface of another application or another interface of WECHAT. The column bubble obtains, by using the column management interface module, the column resource calculation module, and the column system configuration module, a sub-screen 1 on which WECHAT is located and the first column quantity corresponding to a width of a to-be-displayed interface on the sub-screen 1, that is, a quantity of columns included in the width of the to-be-displayed interface on the sub-screen 1.

Figure 8:
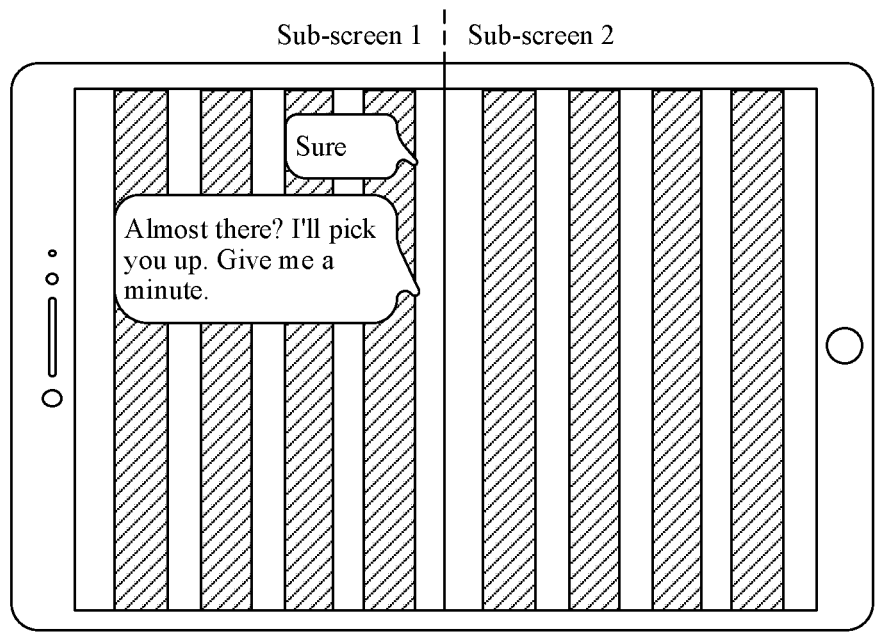
FIG. 8 is a schematic diagram of an effect of another group of dynamic interface layout according to an embodiment of this application.

For example, in the landscape display state, a dp value of the width of the screen and the interface of the tablet computer is 720 dp. In the split-screen display mode, both quantities of pixels of widths of the two sub-screens are 360 dp. In this case, according to the division manner shown in FIG. 2B, a width of the sub-screen 1 includes 4 columns, and the first column quantity corresponding to the width of the to-be-displayed interface on the sub-screen 1 is 4. If the first column quantity in the current display form is 4, with reference to the layout rule of the column bubble, the width of the column bubble on the to-be-displayed interface on the sub-screen 1 occupies a maximum of 4 columns. For a display effect of the column bubble, refer to FIG. 8.

It should be noted that in this embodiment of this application, in the split-screen display mode, the first column quantity refers to a quantity of columns included in a width of a to-be-displayed interface on a sub-screen. In a picture-in-picture display mode or a floating window display mode, for an element in a small window, the first column quantity is a quantity of columns included in a width of a to-be-displayed interface in the small window, and for an element in a large window, the first column quantity is a quantity of columns included in a width of a to-be-displayed interface in the large window. In a full-screen display mode, the first column quantity refers to a quantity of columns included in a width of a to-be-displayed interface on an entire screen. In this embodiment of this application, unless otherwise specified, a display mode of the screen is the full-screen display mode.

For another example, a column control is a column button, and the column button includes a column single button or a column double button.

For example, a layout rule corresponding to the column single button is as follows:
   margin=24 dp;
   gutter=24 dp;
   if the width of the to-be-displayed interface includes 4 columns, a width of the column single button occupies 2 columns;
   if the width of the to-be-displayed interface includes 8 columns, the width of the column single button occupies 3 columns; and
   if the width of the to-be-displayed interface includes 12 columns, the width of the column single button occupies 4 columns.

For another example, a layout rule corresponding to the column double button is as follows:
   margin=24 dp;
   gutter=24 dp;
   if the width of the to-be-displayed interface includes 4 columns, a width of the column double button occupies 4 columns;
   if the width of the to-be-displayed interface includes 8 columns, the width of the column double button occupies 6 columns; and
   if the width of the to-be-displayed interface includes 12 columns, the width of the column double button occupies 8 columns.

The foregoing App Store scenario is used as an example for description. The application is an App Store, the electronic device is a mobile phone, and the mobile phone is in a portrait display state. After detecting that a user taps an icon of the App Store, the mobile phone opens the App Store. An operating system notifies the App Store to run. The App Store needs to prompt the user that a new version is found. The App Store specifies to use a column pop-up window and a column double button to prompt the user that the new version is found. For dynamic layout of the column pop-up window, refer to descriptions in the foregoing embodiments. Dynamic layout of the column double button is mainly described herein.

The App Store is initialized and notifies the column double button to refresh an interface. The column double button obtains, by using a column management interface module, a column resource calculation module, and a column system configuration module, a first column quantity corresponding to a current display form. The column double button invokes the column management interface module, the column resource calculation module, and the column system configuration module by using the method shown in step 403 to step 411, so as to determine width information of the column double button based on the first column quantity and a layout rule of the column double button.

Figure 9A:
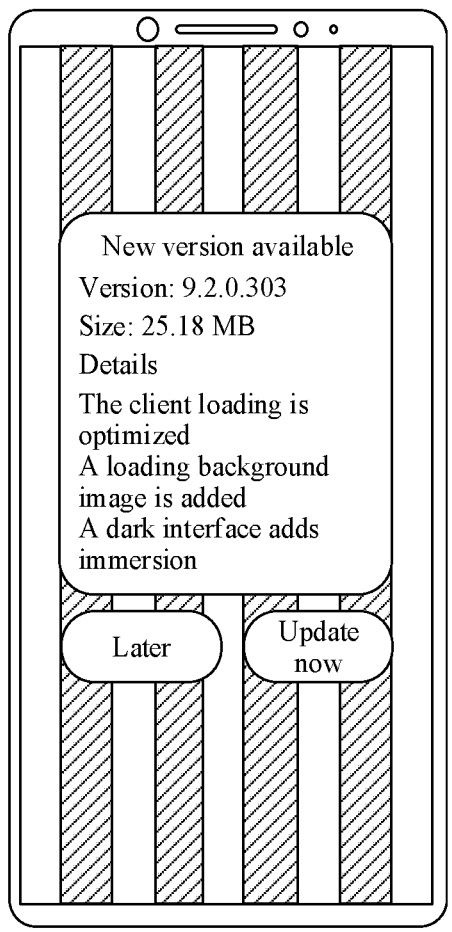
FIG. 9A and FIG. 9B are a schematic diagram of an effect of another group of dynamic interface layout according to an embodiment of this application.
Figure 9B:
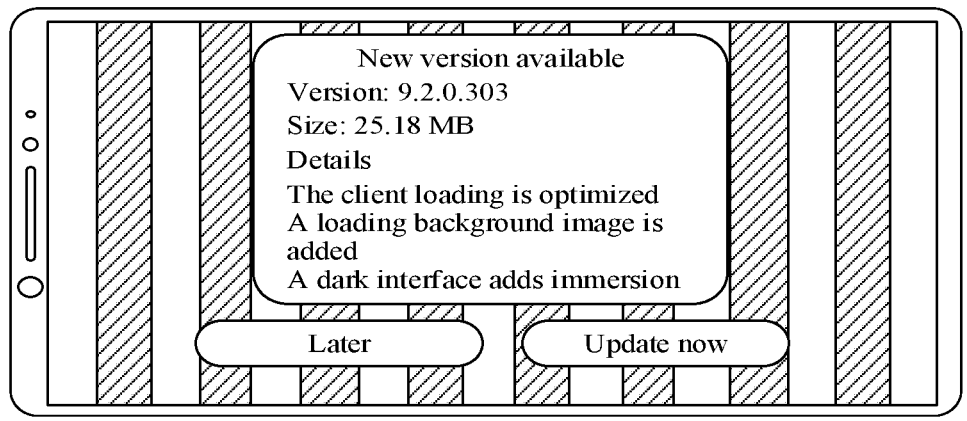

For example, in the portrait display state, widths of a screen and an interface of the mobile phone include 4 columns, and according to the layout rule of the column double button, a width of the column double button occupies 4 columns. For a display effect of the column double button, refer to FIG. 9A. If the user rotates the mobile phone, and the mobile phone switches from the portrait display state to a landscape display state, in the landscape display state, widths of the screen and a to-be-displayed interface of the mobile phone include 8 columns. In this case, according to the layout rule of the column double button, as shown in FIG. 9B, the width of the column double button occupies 6 columns.

For another example, a column control is a column card. For example, a layout rule corresponding to the column card is as follows:
   margin=8 dp;
   gutter=8 dp;
   if the width of the to-be-displayed interface includes 4 columns, a width of the column card occupies 4 columns;
   if the width of the to-be-displayed interface includes 8 columns, the width of the column card occupies 6 columns; and
   if the width of the to-be-displayed interface includes 12 columns, the width of the column card occupies 8 columns.

Figure 10A:
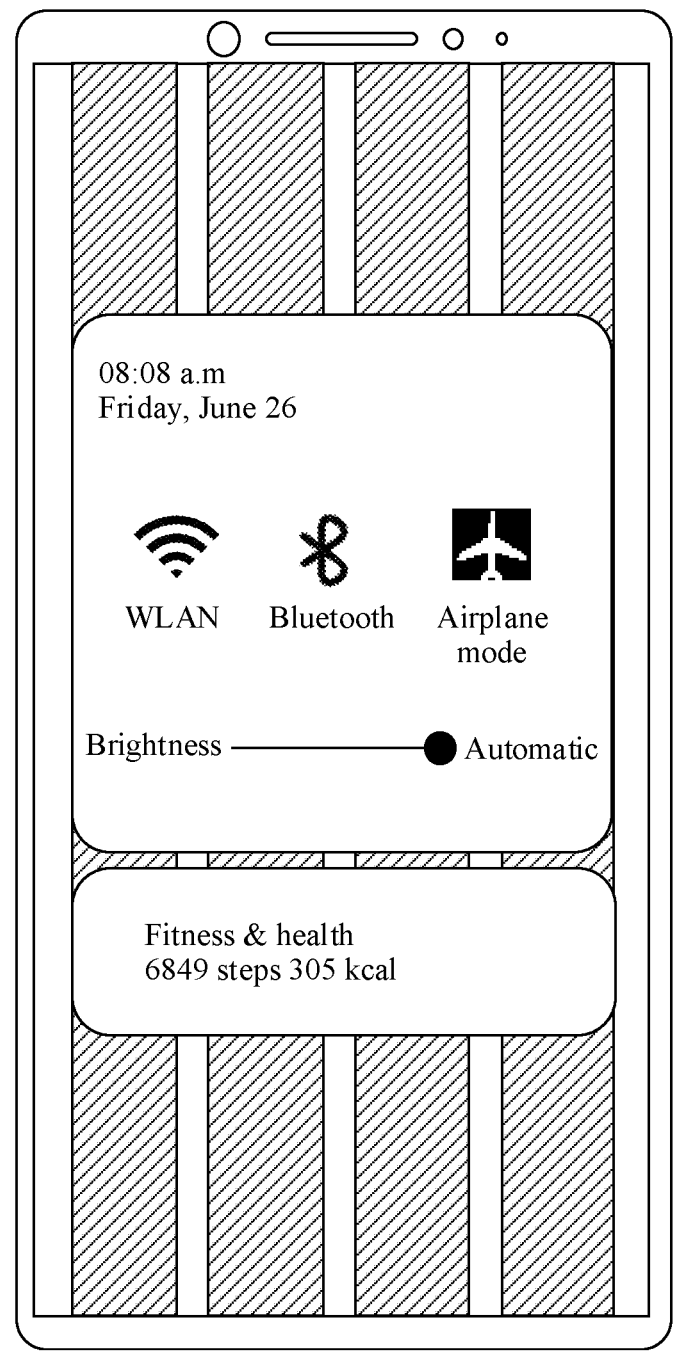
FIG. 10A and FIG. 10B are a schematic diagram of an effect of another group of dynamic interface layout according to an embodiment of this application.

For example, the electronic device is a mobile phone, the application is a status bar, and the mobile phone is currently in a portrait display state. After detecting an operation of pulling down the status bar by a user, the mobile phone opens and displays the status bar. The status bar specifies that the column card is used for display. An operating system notifies the status bar to display an interface. The status bar notifies the column card to refresh the interface. The column card invokes a column management interface module, a column resource calculation module, and a column system configuration module by using the method shown in step 403 to step 411, so as to determine width information of the column card based on a first column quantity corresponding to a current display form and according to a layout rule of the column card. If a width of a to-be-displayed interface of the mobile phone includes 4 columns, according to the layout rule of the column card, a width of the column card used by the status bar occupies 4 columns. If a position of the column card specified by the status bar is upper and left-to-right center, for a display effect of the status bar, refer to FIG. 10A.

Figure 10B:
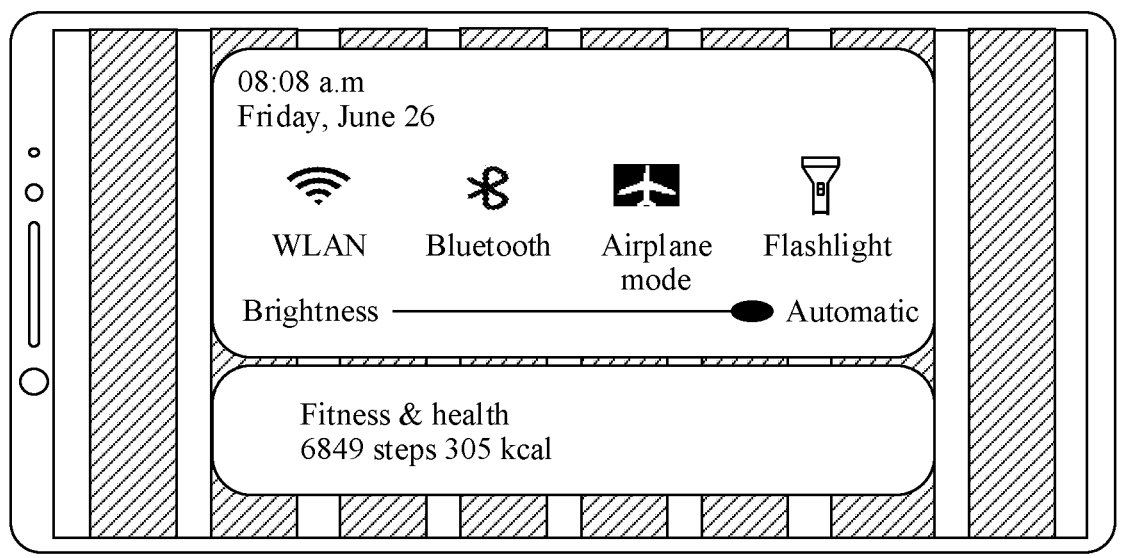

If the user rotates the mobile phone, and the mobile phone switches from the portrait display state to a landscape display state, the operating system notifies the status bar that a display form changes. The status bar notifies the column card to refresh the interface. In the landscape display state, the width of the to-be-displayed interface of the mobile phone occupies 8 columns, according to the layout rule of the column card, as shown in FIG. 10B, the width of the column card used by the status bar occupies 6 columns.

Figure 11A:
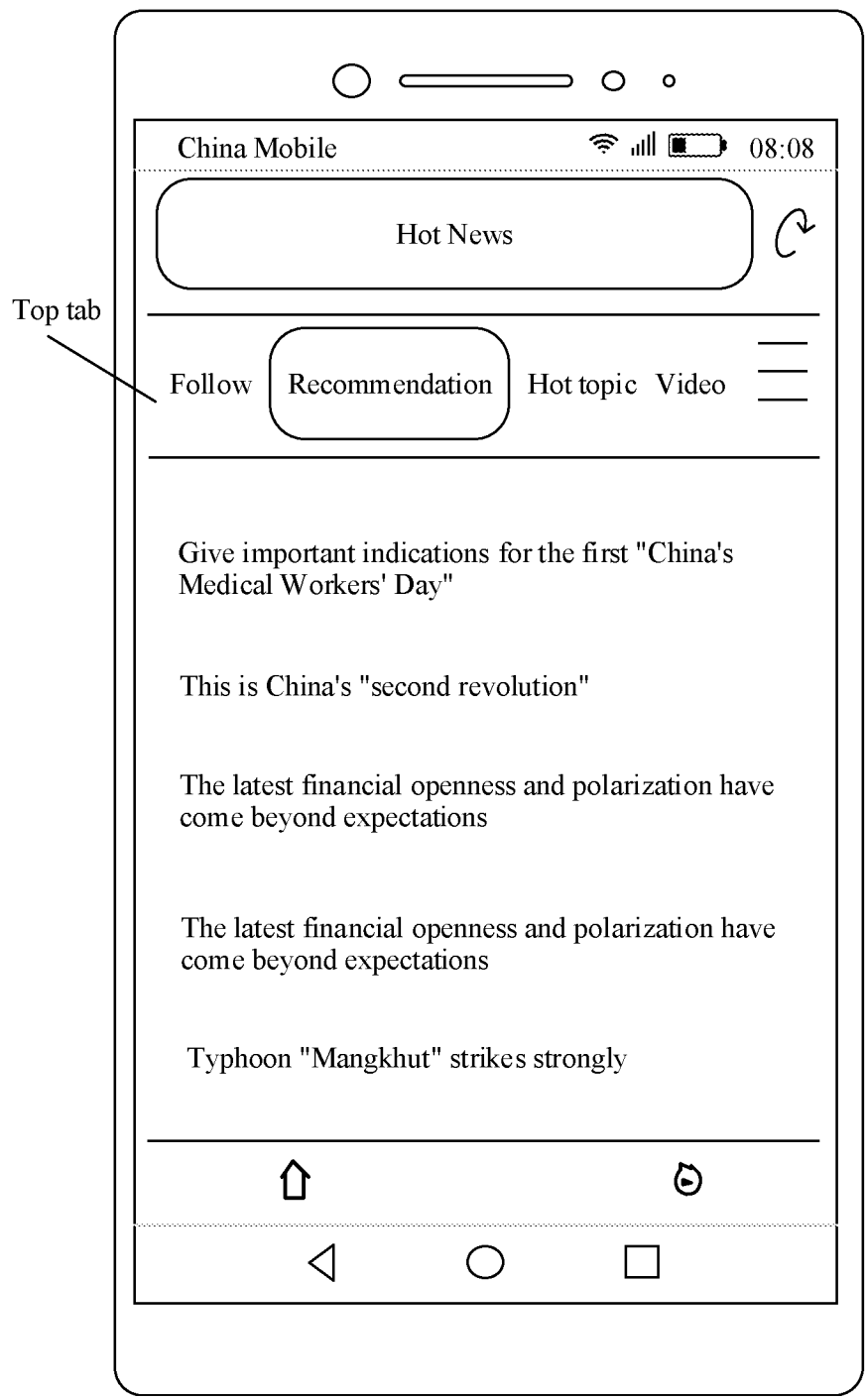
FIG. 11A and FIG. 11B are a schematic diagram of an effect of another group of dynamic interface layout according to an embodiment of this application.
Figure 11B:
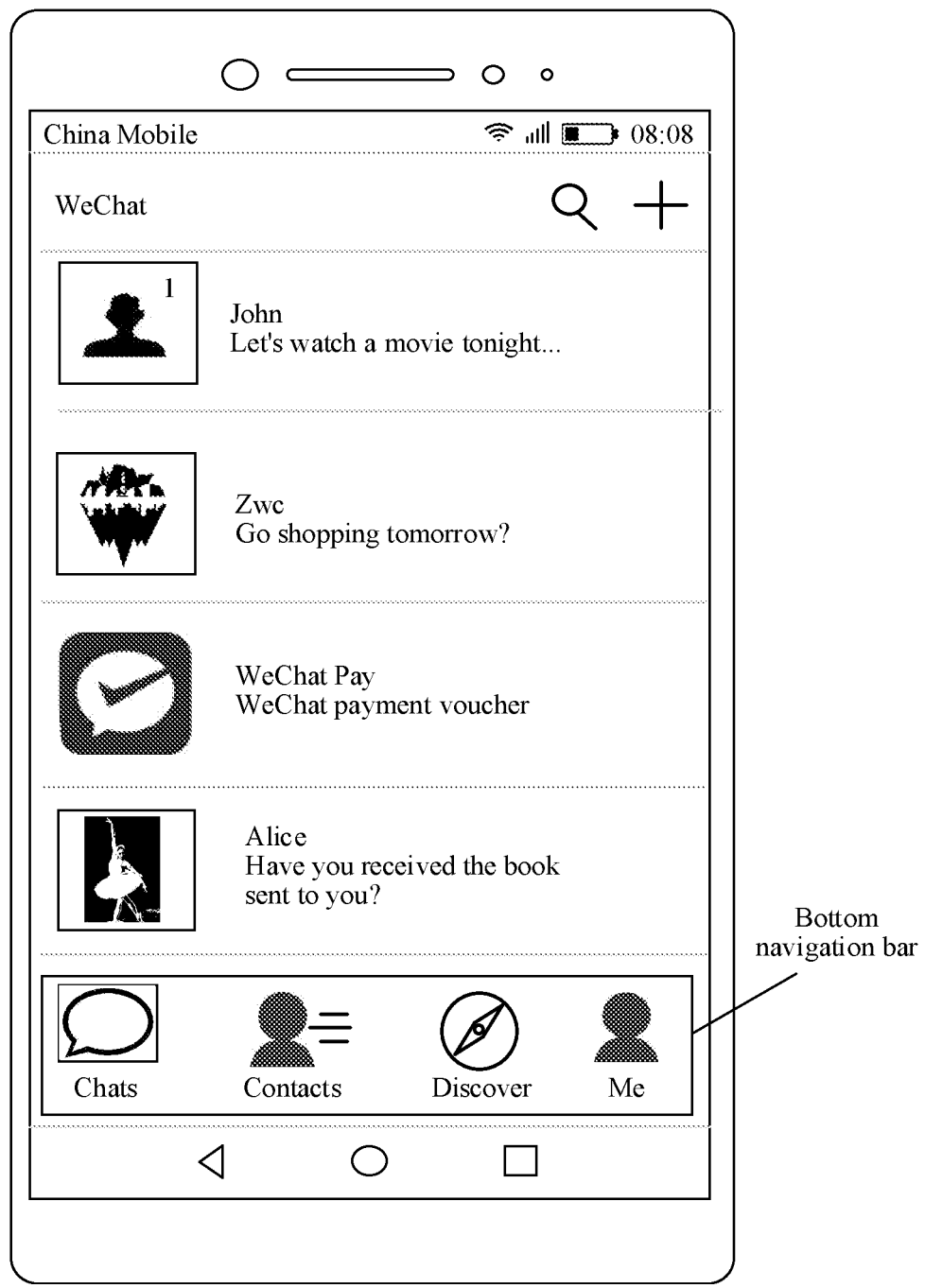

The column pop-up window, column bubble, column button, and column card are used as examples above. The column control may also include a variety of other controls. For example, a top tab of Toutiao shown in FIG. 11A may also be a column control. For another example, a bottom tab of WECHAT shown in FIG. 11B may also be a column control. Another column control is not described in detail in this embodiment of this application.

It can be learned that, when an interface is refreshed, an application with a same set of interface layout may automatically calculate width information of the column control for different display forms according to a layout rule and based on a width size of a to-be-displayed interface, so as to adapt to various display forms to perform dynamic layout of an element and the interface.

In some other embodiments, the electronic device may provide some general templates. An entity of the general template may be an empty control container or an empty layout container. An application can use these general templates during development and fill content into the general template without considering a size of the general template. The application can use the general template to implement various elements, especially elements with complex internal layouts, or some elements that cannot use the column control.

For example, a layout of a startup wizard interface is not suitable for design by using the column control. The startup wizard interface may be used as an element, and the element may be laid out by using the general template. For another example, a clock interface includes content such as a watch face and text information below the watch face, and a layout is complex. The clock interface may be used as an element, and the element may be laid out by using the general template.

The general template corresponds to a corresponding layout rule. Width information of the general template may be dynamically determined according to a layout rule set by a system. When the interface is refreshed, if the interface includes the general template, the general template may dynamically determine the width information of the general template according to a corresponding layout rule, so as to dynamically lay out an element that uses the general template.

Further, in an interface refresh scenario, an operating system may notify the application, and the application may notify the general template. The general template may invoke a column management interface module, a column resource calculation module, and a column system configuration module by using the method shown in step 403 to step 411, so as to determine the width information of the general template based on a width of a to-be-displayed interface corresponding to a current display form and according to the layout rule corresponding to the general template, and dynamically set a width of the general template to implement the dynamic layout of the element and the interface.

In addition, a height of the general template may be determined based on an amount of to-be-displayed content specified by the application, so that the general template is enabled to accommodate the to-be-displayed content specified by the application.

For example, the layout rule corresponding to the general template may be as follows:

margin=24 dp;

gutter=24 dp;

if the width of the to-be-displayed interface includes 4 columns, the width of the general template occupies 4 columns;

if the width of the to-be-displayed interface includes 8 columns, the width of the general template occupies 6 columns; and if the width of the to-be-displayed interface includes 12 columns, the width of the general template occupies 8 columns.

Figure 12A:
FIG. 12A and FIG. 12B are a schematic diagram of an effect of another group of dynamic interface layout according to an embodiment of this application.

For example, the electronic device is a tablet computer, the application is a startup wizard application, and the tablet computer is currently in a portrait display state. After detecting a startup operation of a user, the tablet computer runs the startup wizard application. The startup wizard application specifies that a general template is used for interface display. An operating system notifies the startup wizard application to initialize. The startup wizard application notifies the general template to refresh an interface. The general template invokes a column management interface module, a column resource calculation module, and a column system configuration module by using the method shown in step 403 to step 411, so as to determine width information of the general template based on a first column quantity corresponding to a current display form and according to a layout rule of the general template. If widths of a screen and an interface of the tablet computer include 8 columns, according to the layout rule of the general template, a width of the general template used by a startup wizard interface occupies 6 columns. If a position of the general template specified by the startup wizard application is center, for a display effect of the startup wizard interface, refer to FIG. 12A.

Figure 12B:
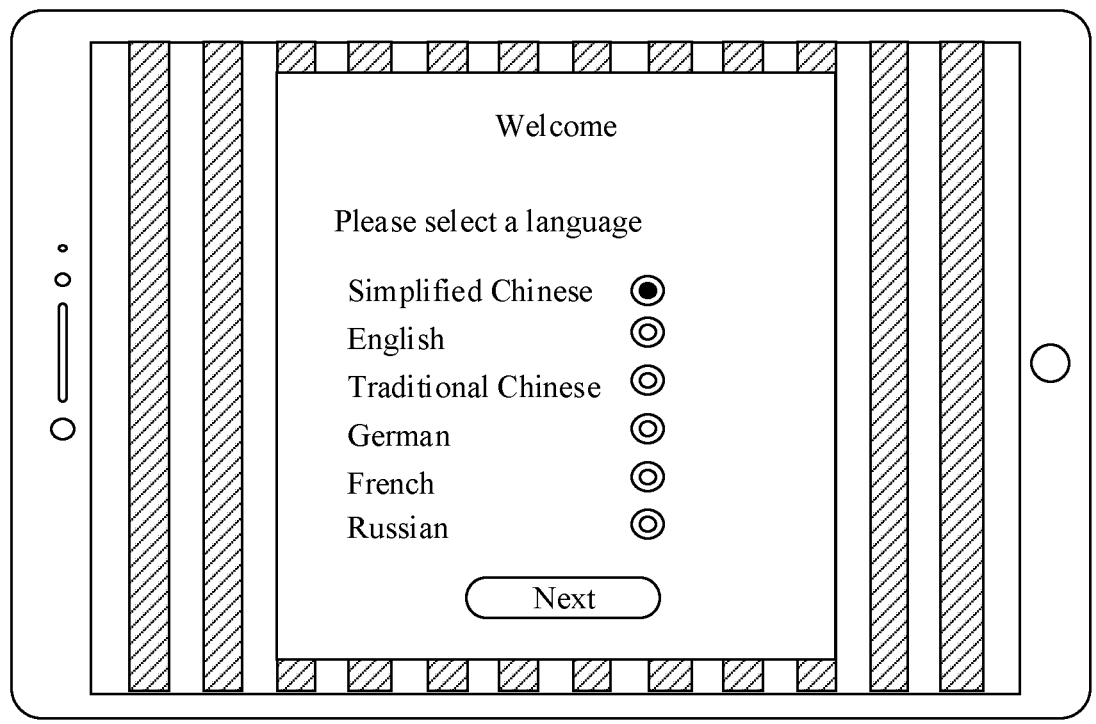

If the user rotates the tablet computer, and the tablet computer switches from the portrait display state to a landscape display state, the operating system notifies a status bar that a display form changes. The startup wizard application notifies the general template to refresh the interface. In the landscape display state, widths of the screen and a to-be-displayed interface of the tablet computer occupy 12 columns, and according to the layout rule of the general template, as shown in FIG. 12B, the width of the general template used by the startup wizard interface occupies 8 columns.

In this way, when the interface is refreshed, an application with a same set of interface layout may automatically calculate width information of an element that uses the general template for different display forms according to a layout rule and based on a width size of the to-be-displayed interface, so as to adapt to various display forms to perform dynamic layout of the 8 element and the interface.

In some other embodiments of this application, the electronic device may provide some API interfaces, and the application may specify layout rules separately corresponding to different elements on the interface. In the interface refresh scenario such as the display form of the electronic device changes, the operating system may notify the application. The application may invoke, through these API interfaces, the layout rules separately corresponding to different elements, and obtain width information that is of the element and that is determined according to the layout rule, so as to perform dynamic layout of the element and the interface. A height of the element may be determined based on an amount of to-be-displayed content specified by the application, so that the element is enabled to accommodate the to-be-displayed content specified by the application.

Figure 13:
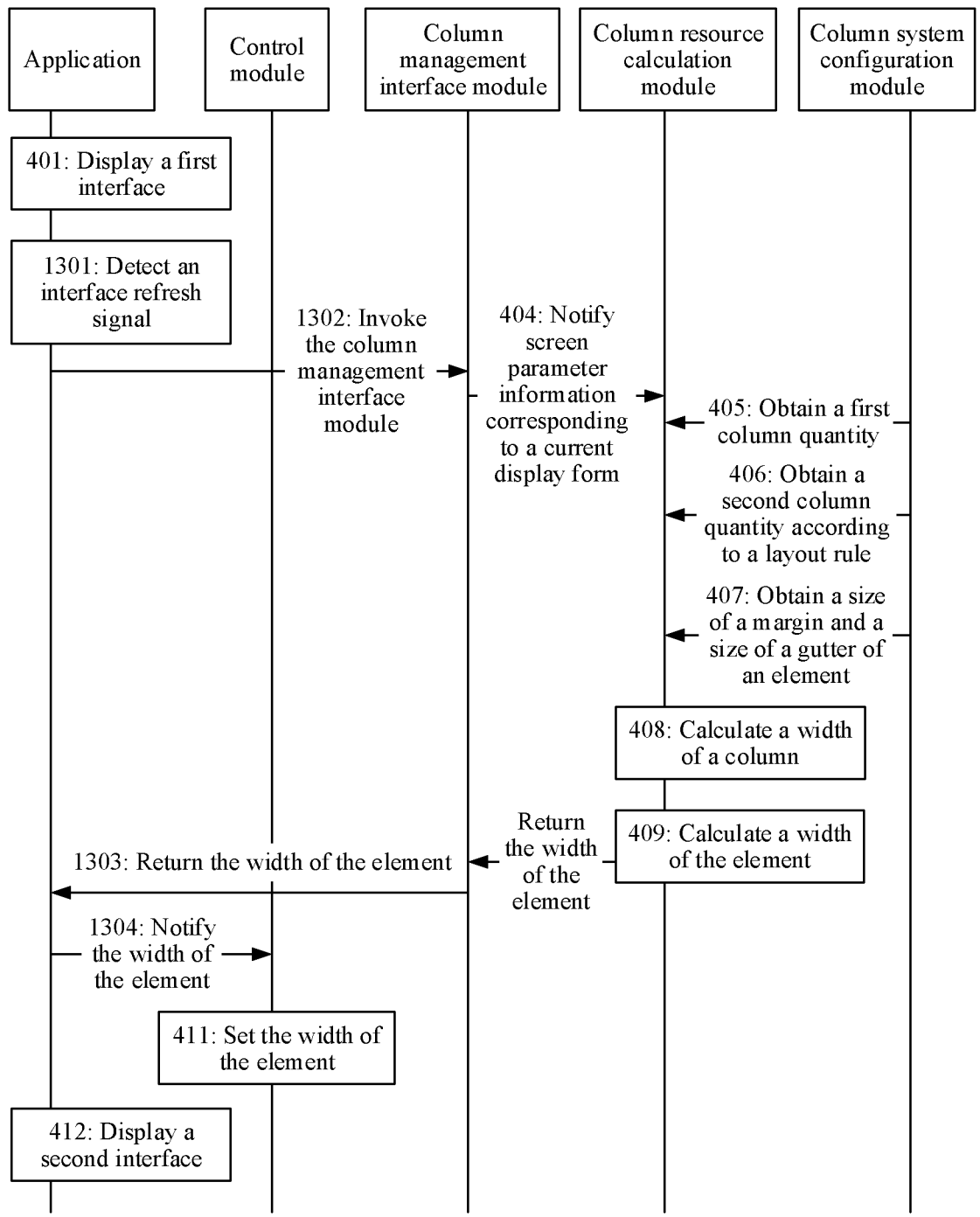
FIG. 13 is a flowchart of another dynamic interface layout method according to an embodiment of this application.

Refer to FIG. 13. In an alternative solution to the method shown in FIG. 4, when determining that an interface refresh scenario is currently displayed, an application may directly invoke an API interface, to determine a width of an element based on a current display form and according to a preset layout rule.

That is, step 402 in FIG. 4 may be replaced with the following step.

1301: The application detects an interface refresh signal.

Step 403 in FIG. 4 may be replaced with the following step.

1302: The application invokes a column management interface module to obtain a width of an element.

Step 410 in FIG. 4 may be replaced with the following step.

1303: The column management interface module returns the width of the element to the application.

After step 1303 and before step 411, the method may further include step 1304.

1304: The application notifies a control module of the width of the element.

For example, when an interface is refreshed, for a pop-up window on a to-be-displayed interface, the application may specify to use the layout rule of the foregoing column pop-up window. For a bubble on the to-be-displayed interface, the application may specify to use the layout rule of the foregoing column pop-up window. For a button on the to-be-displayed interface, the application may specify to use the layout rule of the foregoing column button. For a card on the to-be-displayed interface, the application may specify to use the layout rule of the foregoing column card. For another element with a complex layout, the application may specify to use the layout rule of the foregoing general template.

For example, pseudocode for the application to invoke a corresponding layout rule through the API interface may be as follows:

public void onConfigurationChanged(Configuration newConfig) {//an operating system invokes a function of the application to notify that display configuration information (for example, a dp value or a quantity of columns of widths of a screen and the to-be-displayed interface) changes, that is, a display form changes;
super.onConfigurationChanged(newConfig);
Int newsize=(type, layout rule layout rule) //the application invokes a layout rule corresponding to the element in the API interface to obtain the width of the element;
Aa.setsize(newsize) //the application sets an element AA on the interface to a width indicated by newsize.

Figure 14A:
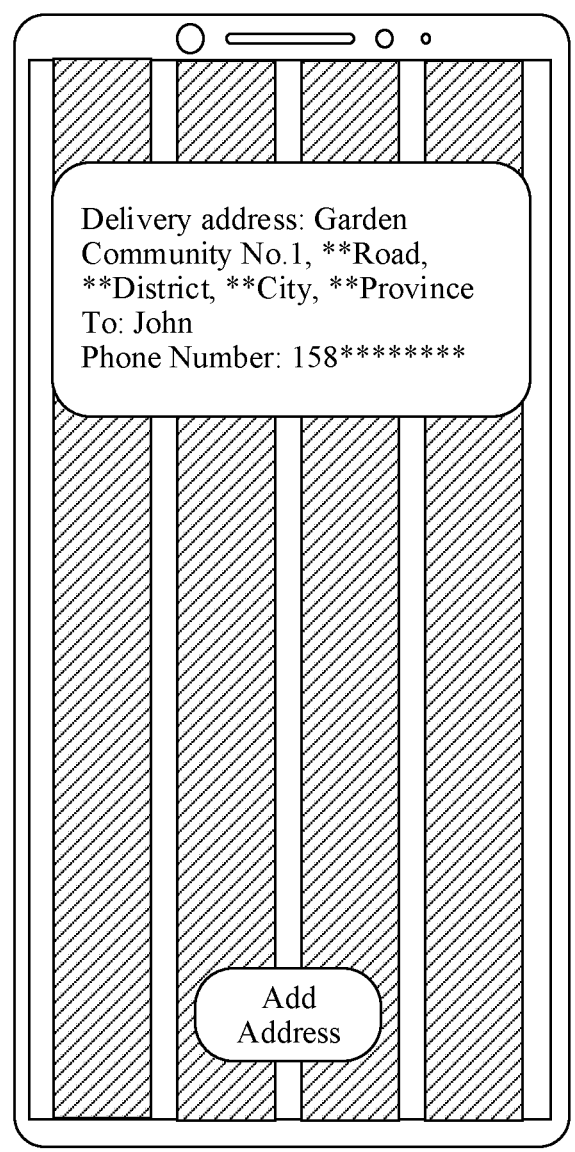
FIG. 14A, FIG. 14B, FIG. 14C, and FIG. 14D are a schematic diagram of an effect of another group of dynamic interface layout according to an embodiment of this application.
Figure 14B:
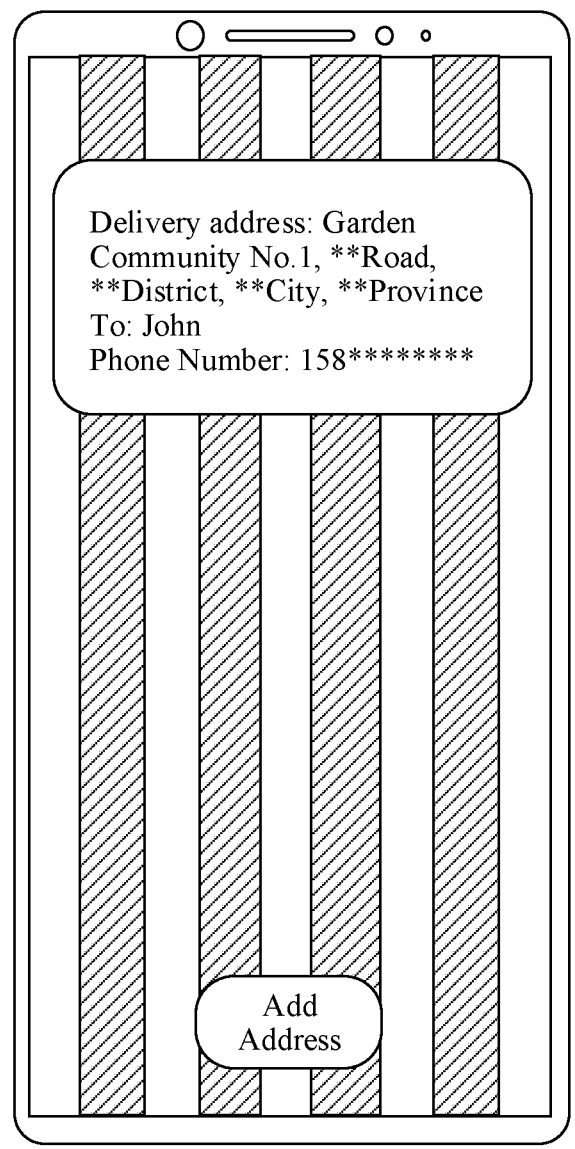
Figure 14C:
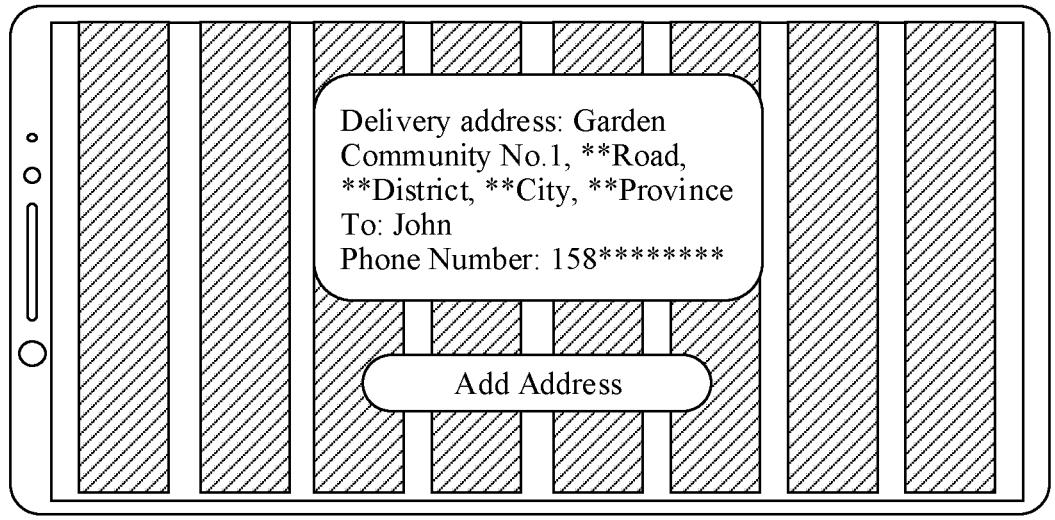

For example, the application is a shopping APP, the electronic device is a mobile phone, the mobile phone is in a portrait display state, and widths of a screen and an interface of the mobile phone include 4 columns. The mobile phone displays an address management interface of the shopping APP shown in FIG. 14A and FIG. 14B. The address management interface includes a column card and a column single button. As shown in FIG. 14A, a width of the card occupies 4 columns. As shown in FIG. 14C, a width of the column single button occupies 2 columns. It can be learned by comparing FIG. 14A with FIG. 14B, that different types of column systems may be used for the column card and the column single button.

After detecting an operation of tapping a home button (or a primary button) by a user, the mobile phone displays a desktop, and the shopping APP switches to the background. Then, the user rotates the mobile phone, so that the mobile phone switches from the portrait display state to a landscape display state, and a width of a to-be-displayed interface includes 8 columns. After the mobile phone detects that the user opens the shopping APP again, the shopping APP is switched from the background to the foreground. A display form of the electronic device changes. An operating system notifies the shopping APP to refresh the interface.

According to the method shown in FIG. 13, the shopping APP may invoke a column management interface module. The column management interface module obtains screen parameter information corresponding to a current display form, and notifies the screen parameter information corresponding to the current display form to a column resource calculation module. Then, the column resource calculation module may obtain, from a column system configuration module, a first column quantity corresponding to a width of a to-be-displayed interface in the current display form. The first column quantity is 8. The column resource calculation module obtains, from the column system configuration module according to a layout rule corresponding to a column card on a to-be-displayed second interface, a second column quantity corresponding to the first column quantity. The second column quantity is 6. The column resource calculation module obtains, from the column system configuration module according to the layout rule corresponding to the column card on the to-be-displayed second interface, a size of a margin and a size of a gutter that are corresponding to the column card. The size of the margin is 8 dp, and the size of the gutter is 8 dp. The column resource calculation module calculates a width of a column based on the screen parameter information corresponding to the current display form, the first column quantity, the size of the margin, and the size of the gutter. The column resource calculation module calculates a width of the column card based on the width of the column and the second column quantity, and returns the width of the column card to the column management interface module. The column management interface module returns the width of the column card to the application. The application notifies a control module of the width of the column card. The control module sets a width of the column card based on the obtained width of the column card. For example, for a schematic diagram of the column card on the address management interface of the shopping APP, refer to FIG. 14C.

Figure 14D:
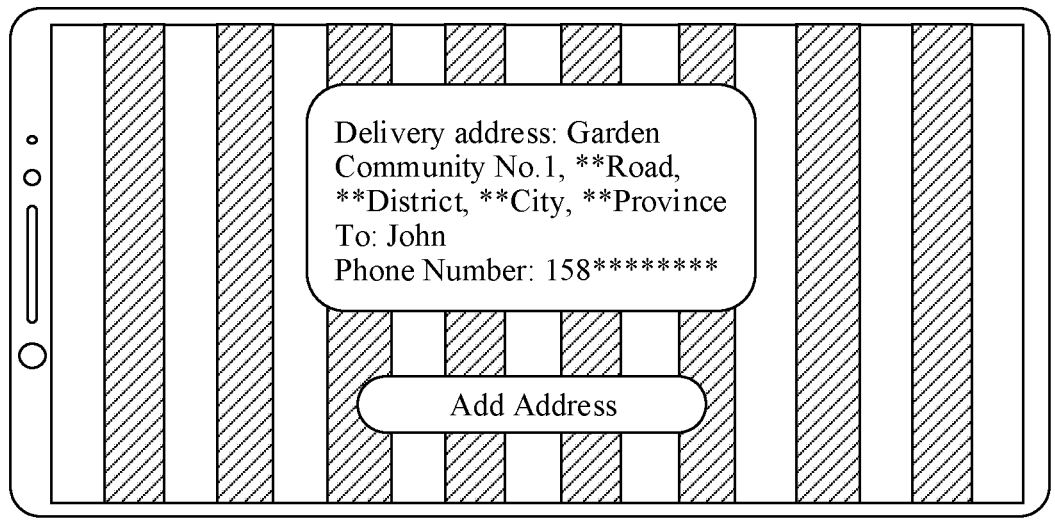

Similarly, according to the method shown in FIG. 13, the shopping APP may obtain information such as a second column quantity of the column single button, a size of a margin, a size of a gutter, and a width of the column single button. For example, the second column quantity of the column single button is 3, the size of the gutter is 24 dp, and the size of the margin is 24 dp. For example, for a schematic diagram of the column single button on the address management interface of the shopping APP, refer to FIG. 14D.

In some other embodiments, the application may obtain sizes of the margin and the gutter through the API interface without obtaining width information of the element, so as to adjust a position of the element on the interface based on the margin and the gutter. For example, the electronic device may obtain the size of the margin based on a definition of a column system, so as to adjust, based on the size of the margin, a position of a to-be-displayed element on the interface from a screen boundary, and the like.

In this way, when the interface is refreshed, an application with a same set of interface layout may automatically calculate width information of elements by invoking layout rules separately corresponding to the elements through the API interface for width sizes of to-be-displayed interfaces in different display forms, so as to adapt to various display forms to perform dynamic layout of the element and the interface. Compared with a plurality of sets of interface layouts in the conventional technology, application development costs are relatively small, and an application packaging file is also relatively small.

In some other embodiments, the electronic device may provide some composite controls. The composite control may include a plurality of elements (or sub-elements), that is, the composite control is a control obtained after a plurality of elements are combined. Each of the plurality of elements may further include at least one sub-element. That is, each element in the composite control may also be a combination of a plurality of elements. The composite control as a whole may also be considered as an element on an interface.

The composite control has a corresponding layout rule. The layout rule corresponding to the composite control may be used to describe a correspondence between relative positions of the plurality of elements in the composite control and a width of a to-be-displayed interface in a current display form, that is, a change rule of the relative positions of the plurality of elements in the composite control. The layout rule corresponding to the composite control may further include a size change rule of each element in the composite control. An application can use these composite controls for interface design. When the interface is refreshed, the electronic device may dynamically lay out the relative positions and sizes of the elements in the composite control according to the layout rule corresponding to the composite control.

For example, the layout rule corresponding to the composite control includes a correspondence between relative positions of a first element and a second element, a height and a width of the first element and the second element, and the width and a height of the to-be-displayed interface in the current display form. For example, a composite control 1 includes an element A and an element B. The element A and the element B are set with a width and a height. The element A and the element B may be arranged in two arrangement forms: horizontal arrangement and vertical arrangement. The two arrangement forms may be switched. The composite control 1 may also be referred to as a moving layout.

For example, a layout rule that is corresponding to the composite control 1 and that is used to set an arrangement manner of the element A and the element B may be as follows.

When the element A and the element B are vertically arranged, if a width W of a to-be-displayed interface can accommodate the horizontal arrangement of the element A and the element B, that is, W≥Width(A)+Width(B)+Margin, the horizontal arrangement is switched, where Width(A) represents a width of the element A, and Width(B) represents a width of the element B.

When the element A and the element B are horizontally arranged, if the width W of the to-be-displayed interface decreases, and cannot accommodate the horizontal arrangement of the element A and the element B, the vertical arrangement is switched.

When the element A and the element B are vertically arranged, if a height of the to-be-displayed interface in a vertical direction meets H<Height(A)+Height(B)+vertialMargin, a scrollbar may be embedded in a composite control container, and the element A and the element B may be displayed in scrolling mode.

Height(A) represents a height of the element A in the vertical direction, Height(B) represents a height of the element B in the vertical direction, and vertialMargin represents a margin in the vertical direction, and is a minimum distance between a content display area of a screen and a screen boundary in the vertical direction.

Units of W, Width(A), Width(B), Margin, H, Height(A), Height(B), and vertialMargin may be dp.

For example, a clock application may use the composite control 1, the element A may be a watch face, and the element B may be related text information under the watch face. For another example, a weather application may use the composite control 1, the element A may be a picture of a weather condition, and the element B may be a text description of the weather condition. For another example, a phone manager may use the composite control 1, the element A may be an optimization detection dial, and the element B may be a control list.

Figure 15A:
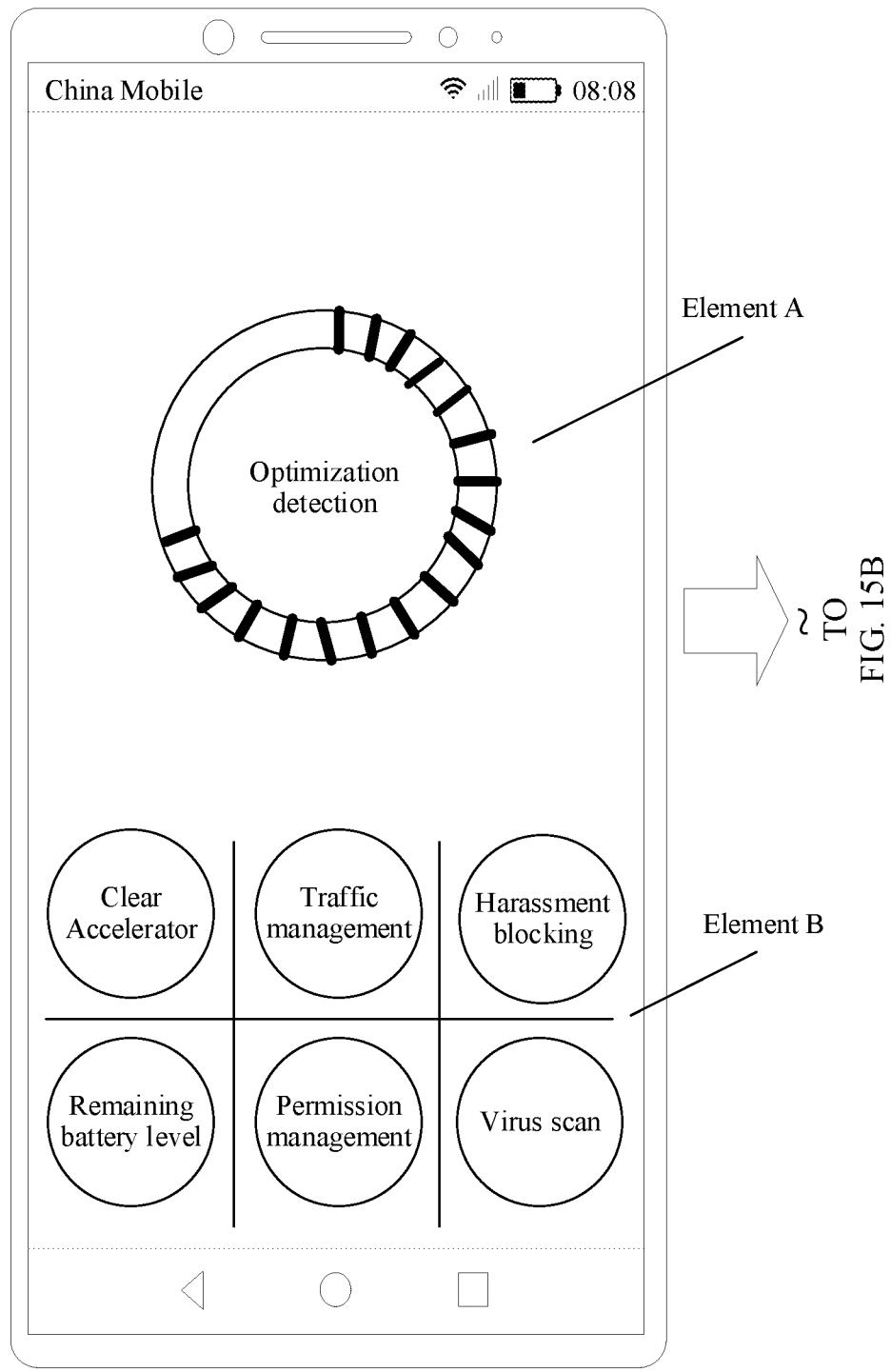
FIG. 15A and FIG. 15B are a schematic diagram of an effect of another group of dynamic interface layout according to an embodiment of this application.
Figure 15B:
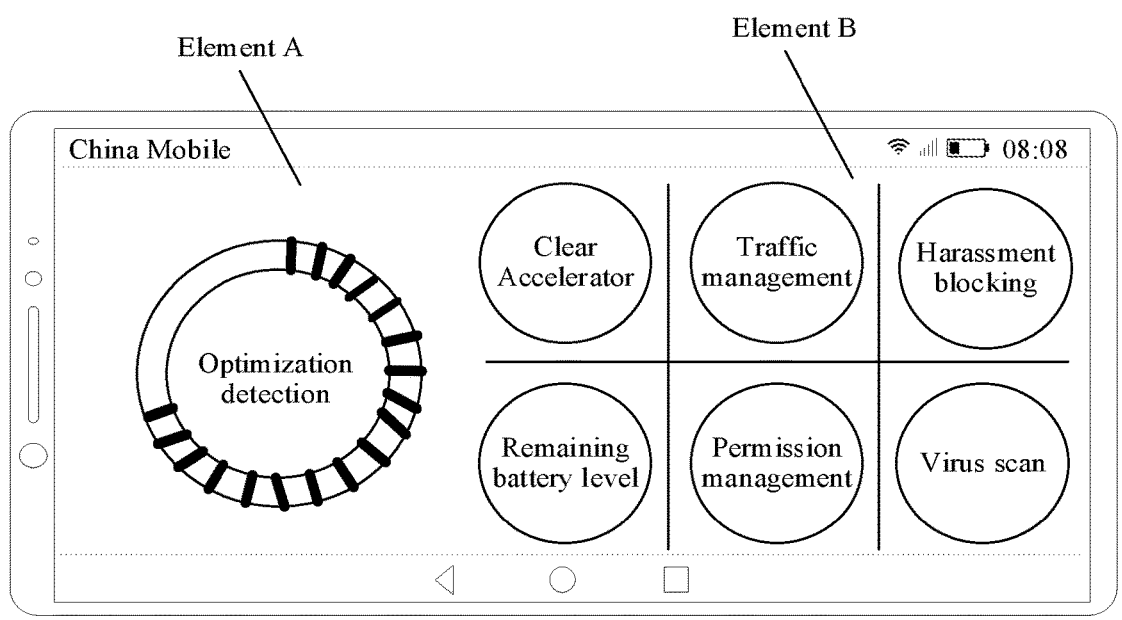

For example, the application is a phone manager, the electronic device is a mobile phone, and the mobile phone is in a portrait display state. As shown in FIG. 15A, the optimization detection dial (that is, the element A) and the control list (that is, the element B) are vertically arranged. If the mobile phone switches to a landscape display state, and a width of a to-be-displayed interface can accommodate horizontal arrangement of the element A and the element B, that is, W≥Width(A)+Width(B)+Margin, as shown in FIG. 15B, the optimization detection dial and the control list switch to be horizontally arranged.

In some embodiments, in the foregoing layout rule used to set the arrangement manner of the element A and the element B of the composite control 1, the width and the height of the element A may be respectively replaced with a minimum width and a minimum height of the element A, and the width and the height of the element B may be respectively replaced with a minimum width and a minimum height of the element B. The layout rule corresponding to the composite control 1 may further include a rule used to dynamically set actual width information of the element A and the element B. Actual widths of the element A and the element B are respectively greater than the minimum widths of the element A and the element B. The electronic device may dynamically determine the arrangement manner of the element A and the element B and actual sizes of the element A and the element B according to the layout rule of the composite control 1.

For another example, a composite control 2 includes a plurality of elements such as A, B, C, and D, and a layout rule corresponding to the composite control 2 may be as follows.

If a dp value of a width of a to-be-displayed interface is less than a preset value 1, the plurality of elements such as A, B, C, and D in the composite control 2 are displayed in one column.

If a dp value of a width of a to-be-displayed interface is greater than or equal to a preset value 1, the plurality of elements such as A, B, C, and D in the composite control 2 are displayed in two columns.

Figure 16A:
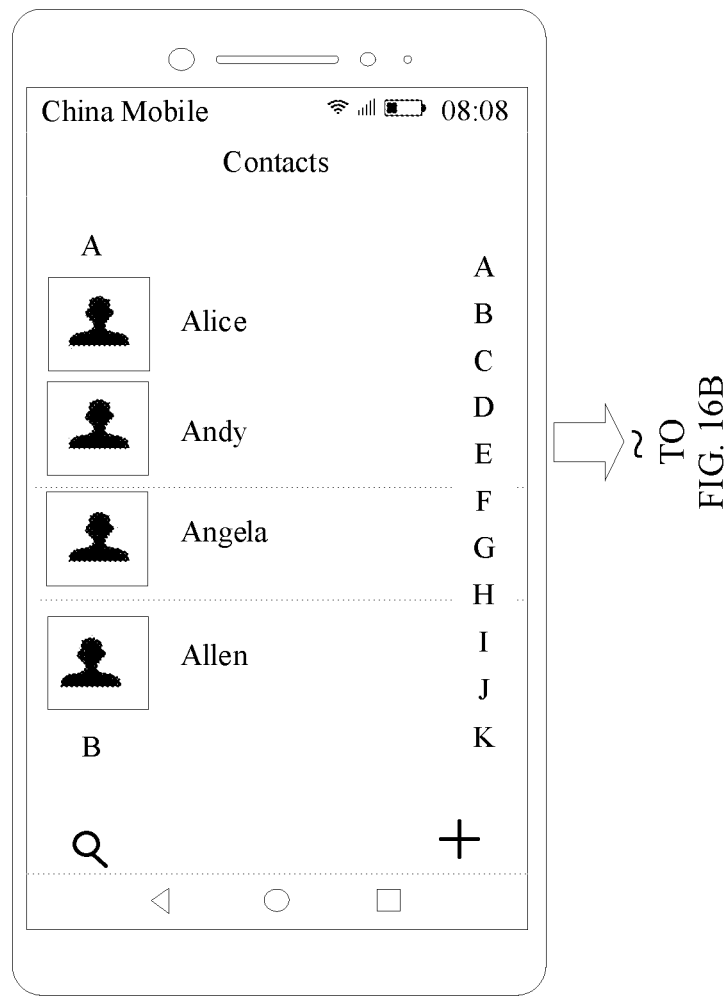
FIG. 16A and FIG. 16B are a schematic diagram of an effect of another group of dynamic interface layout according to an embodiment of this application.
Figure 16B:
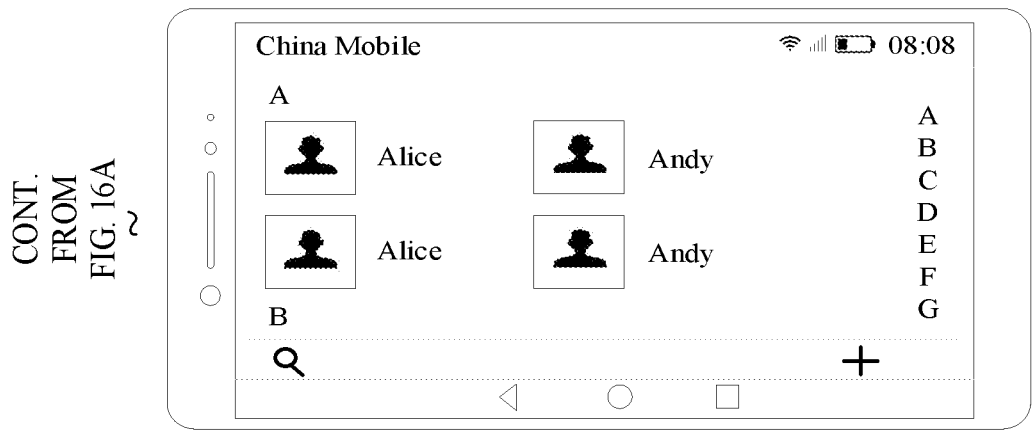

For example, the application is a contact application. On a watch, a dp value of a width of a to-be-displayed interface is less than the preset value 1, as shown in FIG. 16A, and a contact list is displayed in one column. In a landscape display state of a tablet, a dp value of a width of a to-be-displayed interface is greater than or equal to the preset value 1, as shown in FIG. 16B, the contact list is displayed in two columns.

It may be understood that the composite control may be further applied to another scenario such as column splitting. Details are not described in this embodiment of this application.

In this way, when an interface is refreshed, an application with a same set of interface layout may automatically calculate width information of the composite control for different display forms according to a layout rule and based on a width size of a to-be-displayed interface, so as to adapt to various display forms to perform dynamic layout of an element and the interface.

Based on the dynamic interface layout method provided in this embodiment of this application, when the interface is refreshed, the application with the same set of interface layout may automatically calculate a column control on the interface and use an element of a general template and a width of a composite control for different display forms according to the layout rule and based on the width size of the to-be-displayed interface, so as to adapt to various display forms to perform dynamic layout of the element and the interface. Compared with a plurality of sets of interface layouts in the conventional technology, application development costs are relatively small, and an application packaging file is also relatively small.

It should be noted that the layout rule, an element type that can be dynamically laid out, an application scenario, and the like provided in this embodiment of this application are merely examples. It may be understood that, based on the dynamic interface layout method provided in this embodiment of this application, there may be another layout rule, and the method may be further applicable to another element type and an application scenario that are not mentioned in the foregoing embodiments. This is not limited in this embodiment of this application.

It may be understood that, to implement the foregoing functions, an electronic device includes software modules for performing different functions. A person skilled in the art may use different software modules to implement the described functions for each particular application with reference to the embodiments, but it should not be considered that the implementation goes beyond the scope of this application. For example, each function module may be obtained through division based on a corresponding function, or two or more functions may be integrated into one processing module. The integrated module may be implemented in a form of hardware. It should be noted that, in the embodiments, division into modules is an example, and is merely logical function division. During actual implementation, there may be another division manner.

Figure 17:
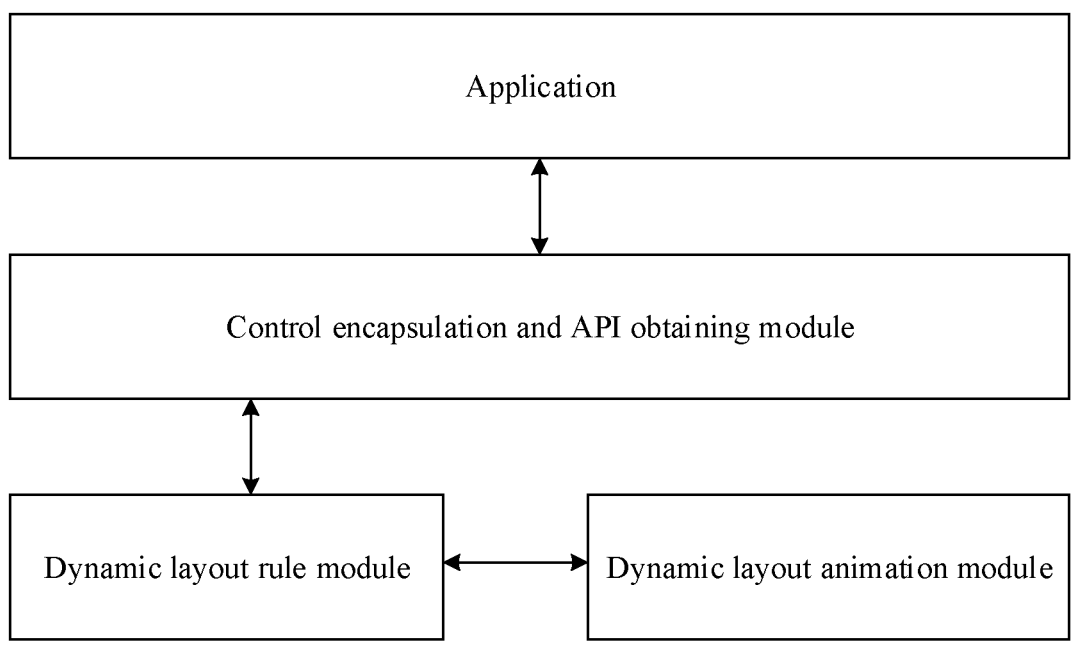
FIG. 17 is a schematic diagram of modules of another software system according to an embodiment of this application.

For example, refer to FIG. 17. In another division manner, the electronic device may include a dynamic layout rule module, a dynamic layout animation module, a control encapsulation and API obtaining module, and an application.

The dynamic layout rule module may be configured to define a corresponding column system for the electronic device, including parameters such as a column quantity, a size of a margin, and a size of a gutter. The module may be further configured to define a layout rule, for example, define a layout rule corresponding to a column control, a general template, a composite control, or the like. In an interface refresh scenario, the module may determine width information of an element (for example, a quantity of columns included in a width of the element) based on a width of a to-be-displayed interface in a current display form and according to the layout rule. The module may further determine parameter information that should be used in the current display form, such as a margin, a gutter, and a width of a column, so as to determine other width information such as a dp value or a quantity of pixels corresponding to the width of the element, and a display position of the element (for example, a distance between the element and a screen boundary), and the like. In addition, in the interface refresh scenario, the module may further determine whether relative positions of elements in the composite control changes.

The dynamic layout animation module may be used to perform animation processing and provide common animation switching such as zooming or moving. For example, when an interface is refreshed, a layout of the element and the interface changes, and the dynamic layout animation module may dynamically display the change.

For example, for the element A and the element B in the composite control 1, when a vertical arrangement state shown in FIG. 15A is switched to a horizontal arrangement state shown in FIG. 15B, the picture does not directly jump but smoothly transit. For example, the element A shown in FIG. 15A is gradually rotated to the left by 90°, and a state shown in FIG. 15B is presented. The element B shown in FIG. 15A smoothly moves to the right, and a state shown in FIG. 15B is presented.

The control encapsulation and API obtaining module may be configured to encapsulate the layout rule, and provide a group of function APIs for applications to invoke, for example, provide a function getMargin( ) for obtaining a margin, a function getGutter( ) for obtaining a gutter, a function getColumnWidth( ) for obtaining a width of a column, and a function getLayoutSize( ) for obtaining a width of an element.

In addition, to simplify application invoking, the module may further directly provide some control groups, such as HwLinearLayout, HwRelativeLayout, and HwFrameLayout, to encapsulate functions such as getMargin( ), getGutter( ), getColumnWidth( ), and getLayoutSize( ). In this way, the application can directly invoke these control groups, and does not need to separately invoke APIs such as getMargin( ) and getGutter( ) and then perform further logic processing.

The application may include a plurality of applications such as clock, camera, gallery, calendar, phone, map, navigation, WLAN, BT, music, videos, messages, or WECHAT.

The foregoing layout rule may be set in an operating system, or may be integrated into the application. When the layout rule is set in the operating system, the dynamic layout rule module, the dynamic layout animation module, the control encapsulation and API obtaining module may be located at an application framework layer of the operating system.

In this embodiment of this application, the dynamic layout rule module may provide definition and rule support for a layout rule encapsulated in the control encapsulation and API obtaining module. When the application refreshes the interface, the application may invoke the layout rule provided by the control encapsulation and API obtaining module to dynamically obtain width information of the element on the interface. The dynamic layout animation module may perform interface animation display based on the dynamically obtained width information of the element.

The foregoing mainly describes the dynamic interface layout method provided in this embodiment of this application from a perspective of the software module. From a perspective of the electronic device, in the dynamic interface layout method provided in this embodiment of this application, the electronic device may automatically perform dynamic layout of the element on the application interface according to the preset layout rule and based on the current display form.

Figure 18:
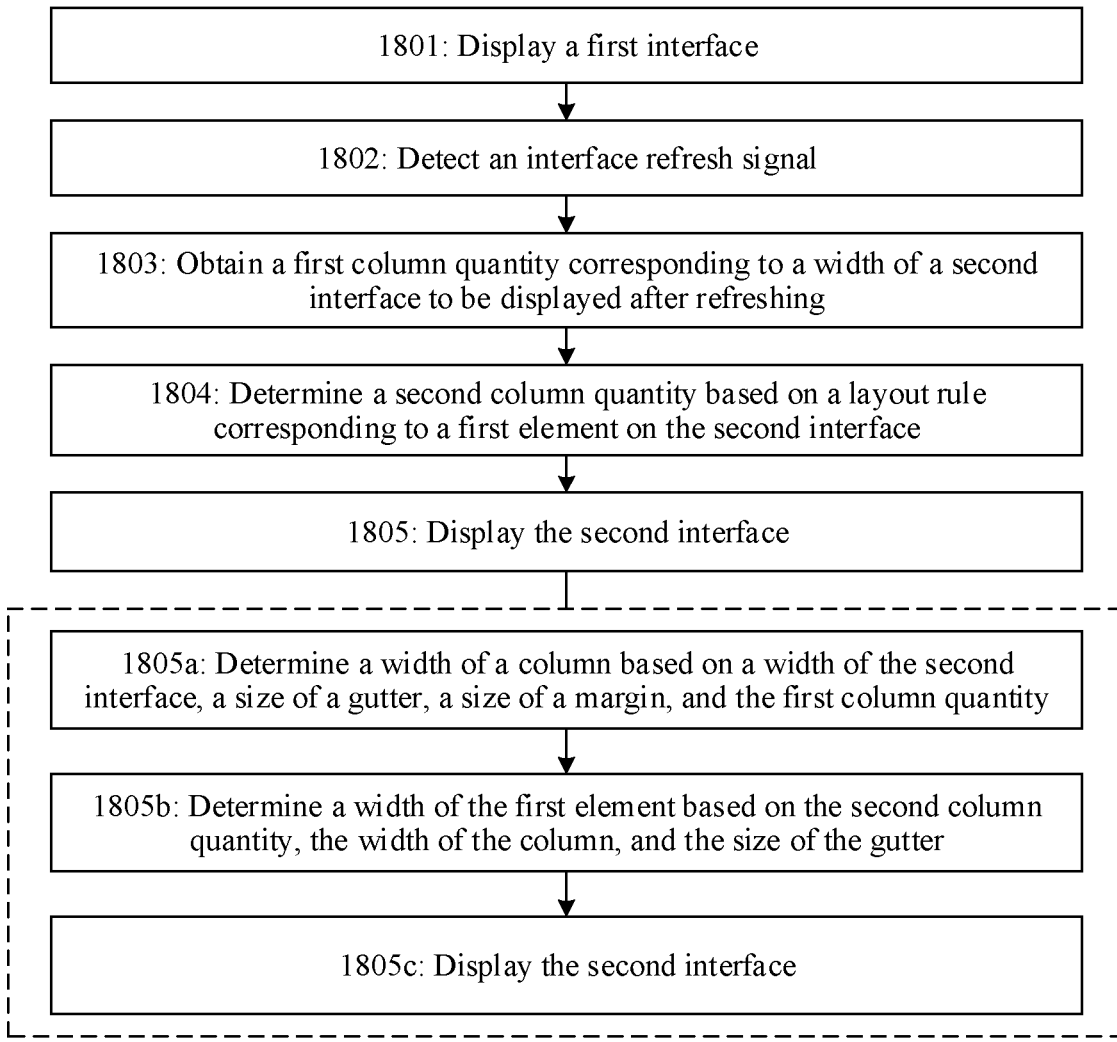
FIG. 18 is a flowchart of another dynamic interface layout method according to an embodiment of this application.

For example, when the layout rule indicates a correspondence between the quantity of columns (that is, a second column quantity) included in the width of the element and a quantity of columns (that is, a first column quantity) included in the width of the to-be-displayed interface in the current display form, for the dynamic interface layout method provided in this embodiment of this application, refer to FIG. 18.

1801: An electronic device displays a first interface.

The first interface may be an interface before refreshing. For example, the first interface may be the interface shown in FIG. 5A.

1802: The electronic device detects an interface refresh signal.

For example, an interface refresh scenario in which the electronic device detects the interface refresh signal may be a scenario in which an application is opened shown in FIG. 5A and FIG. 5B. For another example, the interface refresh scenario may be a landscape/portrait display state switching scenario shown in FIG. 5B and FIG. 5C. For another example, the interface refreshing scenario may be a split-screen display mode switching scenario shown in FIG. 8.

1803: The electronic device obtains a first column quantity corresponding to a width of a second interface to be displayed after refreshing.

For example, in the case shown in FIG. 5A and FIG. 5B, the first column quantity may be 4.

1804: The electronic device determines a second column quantity based on a layout rule corresponding to a first element on the second interface.

The second interface is a to-be-displayed refreshed interface, and the layout rule includes a correspondence between the second column quantity and the first column quantity. For example, in the case shown in FIG. 5B, the first element is a column pop-up window, and the second column quantity of the column pop-up window is 4.

1805: The electronic device displays a second interface.

The second interface includes the first element, and a width of the first element matches the second column quantity.

For example, when the first interface is the interface shown in FIG. 5A, the second interface may be the interface shown in FIG. 5B, and the first element may be the column pop-up window.

Figure 7A:
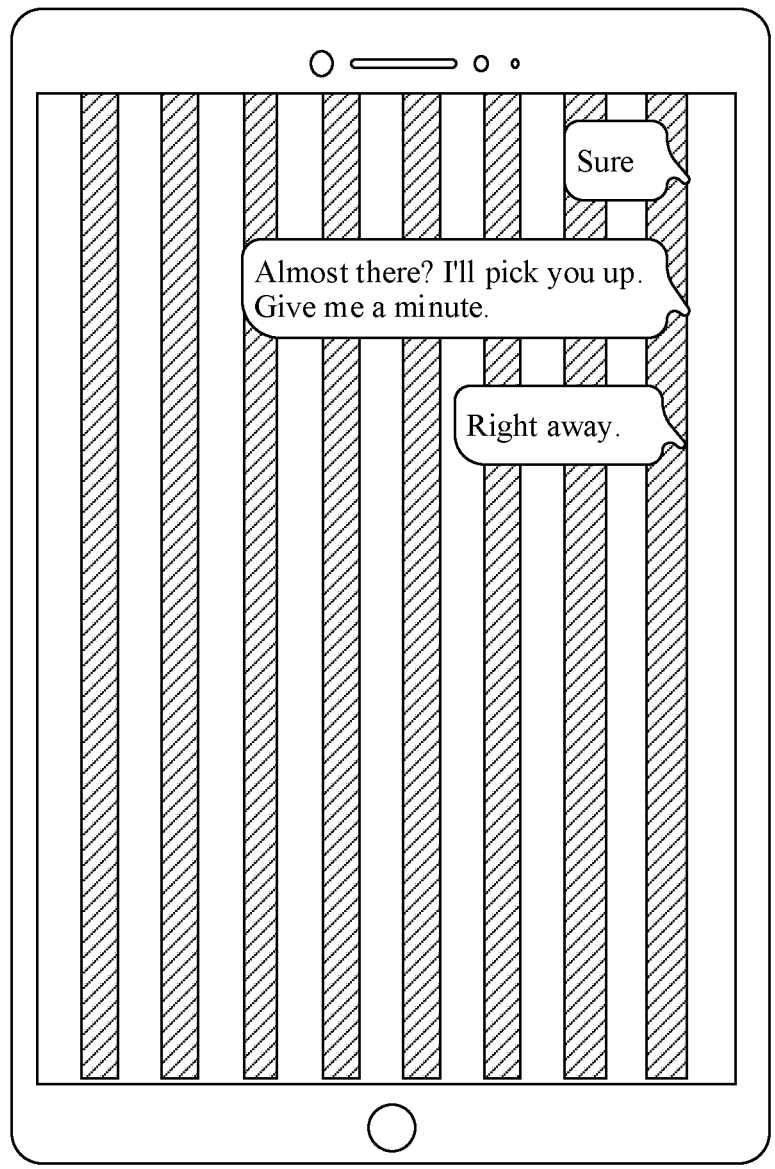
FIG. 7A and FIG. 7B are a schematic diagram of an effect of another group of dynamic interface layout according to an embodiment of this application.
Figure 7B:
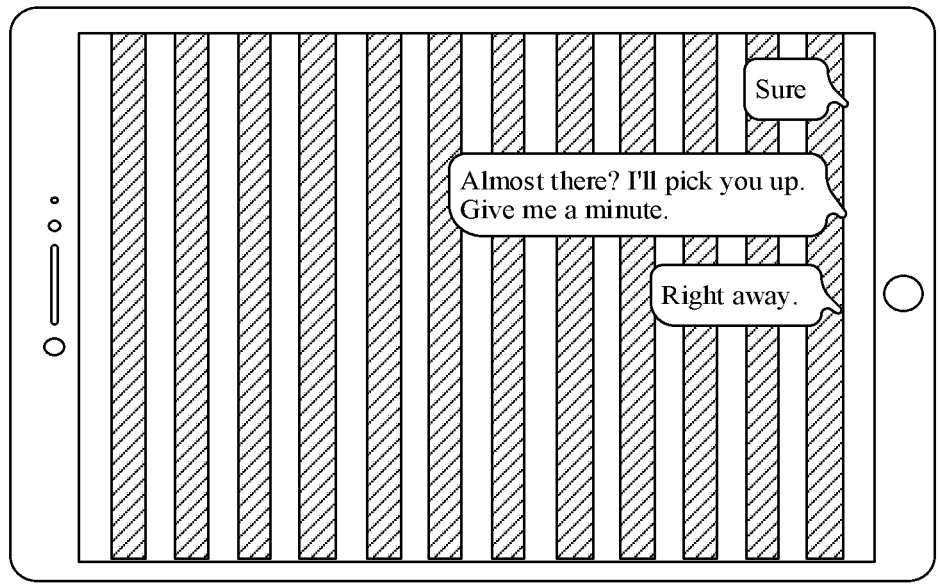

For another example, the first interface may be the interface shown in FIG. 7A, the second interface may be the interface shown in FIG. 7B, and the first element may be a column bubble.

The layout rule further includes a size of a gutter and a size of a margin. The step 1805 may include the following.

1805a: The electronic device determines a width of a column based on a width of the second interface, the size of the gutter, the size of the margin, and the first column quantity.

The width of the second interface may be a dp value corresponding to the width of the second interface, or a quantity of pixels corresponding to the width of the second interface.

1805b: The electronic device determines the width of the first element based on the second column quantity, the width of the column, and the size of the gutter.

For example, the width of the first element may be a dp value corresponding to the width of the first element, or a quantity of pixels corresponding to the width of the first element. The width of the first element may include a sum of widths of adjacent columns of the second column quantity, and a sum of sizes of gutters corresponding to adjacent columns of the second column quantity.

1805c: The electronic device displays the second interface.

The second interface includes the first element, and the electronic device may display the first element on the second interface based on the width of the first element determined in step 1805b.

For example, refer to FIG. 5B, a width of the column pop-up window includes widths of 4 columns and a sum of sizes of 3 gutters between the 4 columns.

For another example, refer to FIG. 6A, the column pop-up window overlaps 6 columns, and the width of the column pop-up window includes a sum of widths of 5 complete columns and sizes of 5 gutters. The 5 gutters are gutters between 6 columns corresponding to the widths of the 5 complete columns.

In the solution described in step 1801 to step 1805, the electronic device may automatically perform dynamic layout of an element and an interface on an application interface based on a current display form. Therefore, for different display forms, an application with a set of interface layout can implement a dynamic display effect of a plurality of interface layouts.

A same electronic device may perform dynamic layout of the element on the application interface according to a preset layout rule and based on the current display form. In this way, for different display forms of the same electronic device, the application with a set of interface layout can implement the dynamic display effect of a plurality of interface layouts. Different electronic devices may perform dynamic layout of the element on the application interface according to the preset layout rule and based on a display form of the electronic device. In this way, for different display forms of different electronic devices, the application with a set of interface layout can implement the dynamic display effect of a plurality of interface layouts.

In the foregoing embodiment, width information of the element may be dynamically determined according to a layout rule corresponding to the width of the element, and a height of the element may be determined based on an amount of to-be-displayed content of the element specified by the application. In some other embodiments, similar to the width information of the element, height information of the element may also be dynamically determined according to a layout rule corresponding to a vertical direction.

The column divided based on a width of a screen may be referred to as a horizoncolumn. The gutter divided based on a width of a screen may be referred to as a horizongutter. The margin divided based on a width of a screen may be referred to as a horizonmargin.

A type of a column system used for heights of a same element may be the same as or different from a type of a column system used for widths of the element. A column divided based on a height of a screen may be referred to as a vertialcolumn. A gutter divided based on a height of a screen may be referred to as a vertialgutter. A margin divided based on a height of a screen may be referred to as a vertialmargin.

In a vertical direction, the screen of the electronic device may include two vertialmargins, several vertialcolumns, and several vertialgutters. The vertialmargin is a distance between a screen boundary and a nearest vertialcolumn. The vertialgutter refers to a distance between a vertialcolumn and a vertialcolumn.

In the foregoing embodiment, an example in which the screen is divided into columns in width, the electronic device presets the layout rule corresponding to the width of the element, and the electronic device dynamically determines the width information of the element according to the layout rule corresponding to the width of the element is used for description. Similar to the layout rule corresponding to the width of the element, the screen can also be divided into columns in height. The electronic device may also preset a layout rule corresponding to a height of the element (for example, a layout rule corresponding to an element such as a column control, a general template, and a composite control), and dynamically determine the height information of the element according to the layout rule corresponding to the height of the element.

The layout rule corresponding to the height of the element may be set together with the layout rule corresponding to the width of the element, or may be set separately from the layout rule corresponding to the width of the element. The layout rule corresponding to the height of the element may also be set in a description file or encapsulated in a function.

In some other embodiments, when the interface is refreshed, the height information of the element on a to-be-displayed interface of the application may be dynamically determined according to the layout rule corresponding to the height of the element, and the width information of the element may be determined based on the amount of to-be-displayed content of the element specified by the application.

In some embodiments, the layout rule provided by the electronic device may be set in an operating system and shared by each application. Each application may set only one set of interface layout. Each application may specify the element to use the column control, the general template, the composite control, or the like, so as to determine, for different display forms, a size of the element according to a layout rule that is corresponding to the column control, the general template, or the composite control and that is provided by the operating system, and implement dynamic layout of the element and the interface. Compared with a plurality of sets of interface layouts in the conventional technology, application development costs are relatively small, and an application packaging file is also relatively small.

In some other embodiments, the layout rule provided by the electronic device may be integrated into the application. The application may set only one set of interface layout. The application may specify the element to use the column control, the general template, the composite control, or the like, so as to determine, for different display forms, a size of the element according to a layout rule that is corresponding to the column control, the general template, or the composite control and that is provided by the application, and implement dynamic layout of the element and the interface. The layout rule has a relatively small amount of information, and occupies relatively small data space. Therefore, compared with a plurality of sets of interface layouts in the conventional technology, application development costs are relatively small, and an application packaging file is also relatively small.

An embodiment of this application further provides an electronic device, including a screen, where a width of the screen is divided into a plurality of columns, one or more processors, a memory, and one or more computer programs. The one or more computer programs are stored in the memory, and the one or more computer programs include instructions. When the instructions are executed by the one or more processors, the electronic device is enabled to perform the steps in the foregoing embodiments, to implement the dynamic interface layout method.

An embodiment of this application further provides a computer storage medium. The computer storage medium stores computer instructions, and when the computer instructions are run on an electronic device, the electronic device is enabled to perform the foregoing related method steps, to implement the dynamic interface layout method in the foregoing embodiments.

An embodiment of this application further provides a computer program product. When the computer program product runs on a computer, the computer is enabled to perform the foregoing related steps, to implement the dynamic interface layout method in the foregoing embodiments.

In addition, an embodiment of this application further provides an apparatus. The apparatus may be a chip system. The chip system is applied to an electronic device. The chip system includes one or more interface circuits and one or more processors. The interface circuit and the processor are interconnected through a line. The interface circuit is configured to receive a signal from a memory of the electronic device, and send the signal to the processor. The signal includes computer instructions stored in the memory. When the processor executes the computer instructions, the electronic device performs the foregoing related steps, to implement the dynamic interface layout method in the foregoing embodiments.

In addition, an embodiment of this application further provides an apparatus. The apparatus may be a component or a module. The apparatus may include a processor and a memory that are connected to each other. The memory is configured to store computer-executable instructions. When the apparatus runs, the processor may execute the computer-executable instructions stored in the memory, to enable a chip to perform the dynamic interface layout method in the foregoing method embodiments.

The electronic device, the chip, the computer storage medium, or the computer program product or the chip provided in the embodiments of this application are all configured to perform the corresponding method provided above. Therefore, for beneficial effects that can be achieved, refer to the beneficial effects of the corresponding method provided above. Details are not described herein again.

The foregoing descriptions about implementations allow a person skilled in the art to understand that, for convenient and brief description, division into the foregoing function modules is taken as an example for illustration. In actual application, the foregoing functions can be allocated to different modules and implemented based on a requirement, in other words, an inner structure of an apparatus is divided into different function modules to implement all or some of the functions described above.

In the several embodiments provided in this application, it should be understood that the disclosed apparatuses and methods may be implemented in other manners. For example, the described apparatus embodiments are merely examples. For example, division into the modules or units is merely logical function division, and may be other division during actual implementation. For example, a plurality of units or components may be combined or may be integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate components may or may not be physically separate, and components displayed as units may be one or more physical units, that is, may be located in one place, or may be distributed on a plurality of different places. A part or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a readable storage medium. Based on such an understanding, the technical solutions of the embodiments of this application essentially, or the part contributing to the conventional technology, or all or some of the technical solutions may be implemented in a form of a software product. The software product is stored in a storage medium and includes several instructions for instructing a device (which may be a single-chip microcomputer, a chip, or the like) or a processor to perform all or some of the steps of the methods in the embodiments of this application. The foregoing storage medium includes any medium that can store program code, such as a USB flash drive, a removable hard disk, a read-only memory (ROM), a RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A dynamic interface layout method implemented by an electronic device, wherein the dynamic interface layout method comprises:
    displaying a first interface on a screen of the electronic device, wherein a first width of the screen is divided into a plurality of columns;
    detecting an interface refresh signal;
    obtaining a first column quantity corresponding to a second width of a second interface to be displayed after refreshing, wherein the first column quantity is a quantity of columns comprised in the second width;
    determining a second column quantity according to a first layout rule corresponding to a first element on the second interface, wherein the second column quantity is a quantity of columns comprised in a third width of the first element, and wherein the first layout rule comprises a first correspondence between the second column quantity and the first column quantity; and
    displaying, based on the second column quantity, the second interface on the screen.

2. The dynamic interface layout method of claim 1, wherein the first width further comprises:
    a gutter that is a first distance between two adjacent columns; and
    a margin that is a second distance between a first boundary on a left side of the screen and a nearest column or a second boundary on a right side of the screen and the nearest column.

3. The dynamic interface layout method of claim 2, wherein the first layout rule further comprises a first size of the gutter and a second size of the margin, and wherein the dynamic interface layout method further comprises:
    determining a fourth width of a column based on the second width, the first size, the second size, and the first column quantity; and
    determining the third width based on the second column quantity, the fourth width, and the first size.

4. The dynamic interface layout method of claim 1, wherein detecting the interface refresh signal comprises detecting an operation of opening an application.

5. The dynamic interface layout method of claim 1, wherein detecting the interface refresh signal comprises detecting that a width of an interface has changed.

6. The dynamic interface layout method of claim 5, wherein detecting that the width of the interface has changed comprises detecting that a display status comprising a landscape display state or a portrait display state has been switched.

7. The dynamic interface layout method of claim 5, wherein the screen is a foldable screen, and wherein detecting that the width of the interface has changed comprises detecting that a folding state of the foldable screen has changed.

8. The dynamic interface layout method of claim 5, wherein detecting that the width of the interface has changed comprises detecting that a display mode comprising a full-screen display mode, a split-screen display mode, a picture-in-picture display mode, or a floating window display mode has been switched.

9. The dynamic interface layout method of claim 1, wherein the second width is represented by a first parameter, and wherein different intervals in which the first parameter is located correspond to different first column quantities.

10. The dynamic interface layout method of claim 1, wherein the second width varies with a size of the screen, a proportion of the screen, a display status of the screen, or a display mode of the screen, wherein the display status comprises a landscape display state or a portrait display state, and wherein the display mode comprises a full-screen display mode, a split-screen display mode, a picture-in-picture display mode, or a floating window display mode.

11. The dynamic interface layout method of claim 1, further comprising controlling the first element to invoke an application programming interface (API).

12. The dynamic interface layout method of claim 1, further comprising invoking an application programming interface (API).

13. The dynamic interface layout method of claim 1, wherein the first layout rule comprises:
- a first size of a margin equals to a first preset value;
- a second size of a gutter equals to a second preset value;
- the second column quantity is a fourth preset value when the first column quantity is a third preset value; and
- the second column quantity is a sixth preset value when the first column quantity is a fifth preset value,
- wherein the fifth preset value is greater than the third preset value, and
- wherein the sixth preset value is greater than the fourth preset value.

14. The dynamic interface layout method of claim 13, wherein the first layout rule further comprises:
- the second column quantity is further the fourth preset value when a ratio of the second width to a height of the second interface is greater than a first preset ratio; and
- the second column quantity is the sixth preset value when the ratio is less than or equal to the first preset ratio.

15. The dynamic interface layout method of claim 1, wherein the first element is a composite control comprising a first sub-element and a second sub-element, and wherein a layout rule corresponding to the composite control further comprises a correspondence between relative positions of the first sub-element and the second sub-element and the second width.

16. The dynamic interface layout method of claim 15, wherein the second layout rule further comprises a third correspondence between the relative positions, a first height of the first sub-element, a fourth width of the first sub-element, a second height of the second sub-element, a fifth width of the second sub-element, the second width and a third height of the second interface.

17. The dynamic interface layout method of claim 16, wherein the composite control further comprises a sub-element A and a sub-element B, and wherein the second layout rule further comprises:
- the sub-element A and the sub-element B are switched to be arranged in a second direction when the sub-element A and the sub-element B are arranged in a first direction and when W≥Width(A)+Width(B)+Margin, wherein W represents the second width, wherein Width(A) represents a sixth width of the sub-element A, and wherein Width(B) represents a seventh width of the sub-element B;
- the sub-element A and the sub-element B are switched to be arranged in the first direction when the sub-element A and the sub-element B are arranged in the second direction and when W<Width(A)+Width(B)+Margin; and
- a scrollbar is embedded in the composite control and is configured to display the sub-element A and the sub-element B in a scrolling mode when the sub-element A and the sub-element B are arranged in the first direction and when H<Height(A)+Height(B)+vertialMargin, wherein H represents the third height, wherein Height(A) represents a fourth height of the sub-element A, wherein Height(B) represents a fifth height of the sub-element B, and wherein vertialMargin represents a size of a margin of the screen in the first direction.

18. An electronic device comprising:
- a screen, wherein a first width of the screen is divided into a plurality of columns;
- a memory configured to store a code; and
- a processor coupled to the screen and the memory, wherein when executed by the processor, the code causes the electronic device to:
  - display a first interface on the screen;
  - detect an interface refresh signal;
  - obtain a first column quantity corresponding to a second width of a second interface to be displayed after refreshing, wherein the first column quantity is in the second width;
  - determine a second column quantity according to a layout rule corresponding to a first element on the second interface, wherein the second column quantity is in a third width of the first element, and wherein the layout rule comprises a correspondence between the second column quantity and the first column quantity; and
  - display the second interface on the screen.

19. The electronic device of claim 18, wherein the first width further comprises:
- a gutter that is a first distance between two adjacent columns; and
- a margin that is a second distance between a first boundary on a left side of the screen and a nearest column or a second boundary on a right side of the screen and the nearest column.

20. A computer program product comprising computer-executable instructions that are stored on a non-transitory computer-readable medium and that, when executed by a processor, cause an electronic device to:
- display a first interface on a screen of the electronic device, wherein a first width of the screen comprises a plurality of columns;
- detect an interface refresh signal;
- obtain a first column quantity corresponding to a second width of a second interface to be displayed after refreshing, wherein the first column quantity is in the second width;
- determine a second column quantity according to a layout rule corresponding to a first element on the second interface, wherein the second column quantity is in a third width of the first element, and wherein the layout rule comprises a correspondence between the second column quantity and the first column quantity; and
- display the second interface on the screen.

* * * * *

UNITED STATES PATENT AND TRADEMARK OFFICE
CERTIFICATE OF CORRECTION

PATENT NO. : 11,709,688 B2
APPLICATION NO. : 17/667778
DATED : July 25, 2023
INVENTOR(S) : Xiaoxiao Chen et al.

It is certified that error appears in the above-identified patent and that said Letters Patent is hereby corrected as shown below:

On the Title Page

Item (71) Applicant: Huawei Device Co., Ltd., Guangdong (CN) should read Huawei Device Co., Ltd., Dongguan (CN)

Signed and Sealed this
Nineteenth Day of September, 2023

Katherine Kelly Vidal
*Director of the United States Patent and Trademark Office*